(12) United States Patent
Ouellette

(10) Patent No.: US 6,508,350 B1
(45) Date of Patent: Jan. 21, 2003

(54) APPARATUS FOR AVOIDING FALLING OVER OF OBJECTS CONVEYED ON A CONVEYOR SYSTEM

(75) Inventor: Joseph F. Ouellette, Glendale, MO (US)

(73) Assignee: Ouellette Machinery Systems, Inc., Fenton, MO (US)

( * ) Notice: Subject to any disclaimer, the term of this patent is extended or adjusted under 35 U.S.C. 154(b) by 0 days.

(21) Appl. No.: 09/723,579

(22) Filed: Nov. 28, 2000

Related U.S. Application Data

(63) Continuation of application No. 09/590,894, filed on Jun. 9, 2000.

(51) Int. Cl.⁷ .............................................. B65G 47/00
(52) U.S. Cl. ...................... 198/358; 198/437; 198/577; 198/689.1
(58) Field of Search ................................ 198/357, 358, 198/437, 444, 367.1, 577, 689.1

(56) References Cited

U.S. PATENT DOCUMENTS

| | | | |
|---|---|---|---|
| 3,751,873 A | * 8/1973 | Toby | ........................ 53/59 R |
| 4,360,098 A | * 11/1982 | Nordstrom | ................... 198/419 |
| 5,098,077 A | * 3/1992 | Russel | ............................ 271/5 |
| 5,143,199 A | * 9/1992 | Evans | ..................... 198/418.1 |
| 5,186,306 A | * 2/1993 | Sjostrand | .................... 198/442 |
| 5,246,223 A | * 9/1993 | Ricciardi et al. | ........... 271/149 |
| 5,267,638 A | * 12/1993 | Doane | ........................ 198/357 |
| 5,461,468 A | * 10/1995 | Dempsey et al. | ........... 355/316 |
| 6,023,034 A | * 2/2000 | Nakajima et al. | ........... 209/584 |
| 6,131,720 A | * 10/2000 | Heuft et al. | ................. 198/367 |
| 6,347,697 B1 | * 2/2002 | Ouellette et al. | ........... 198/358 |

* cited by examiner

*Primary Examiner*—Douglas Hess
(74) *Attorney, Agent, or Firm*—Thompson Coburn LLP

(57) ABSTRACT

A conveyor system includes a diverter positioned between an upstream conveyor and a pair of downstream conveyors and splits or switches a procession of objects conveyed by the upstream conveyor to one of the two downstream conveyors where both downstream conveyors are provided with a plurality of sensors along their lengths that detect the presence or absence of objects on the downstream conveyors at different positions along their lengths and supply signals to the diverter to control the diverter to switch between the two downstream conveyors to direct the objects conveyed by the upstream conveyor to the one of the two downstream conveyors having fewer objects being conveyed by the conveyor and also controls the speed of the upstream conveyor.

16 Claims, 14 Drawing Sheets

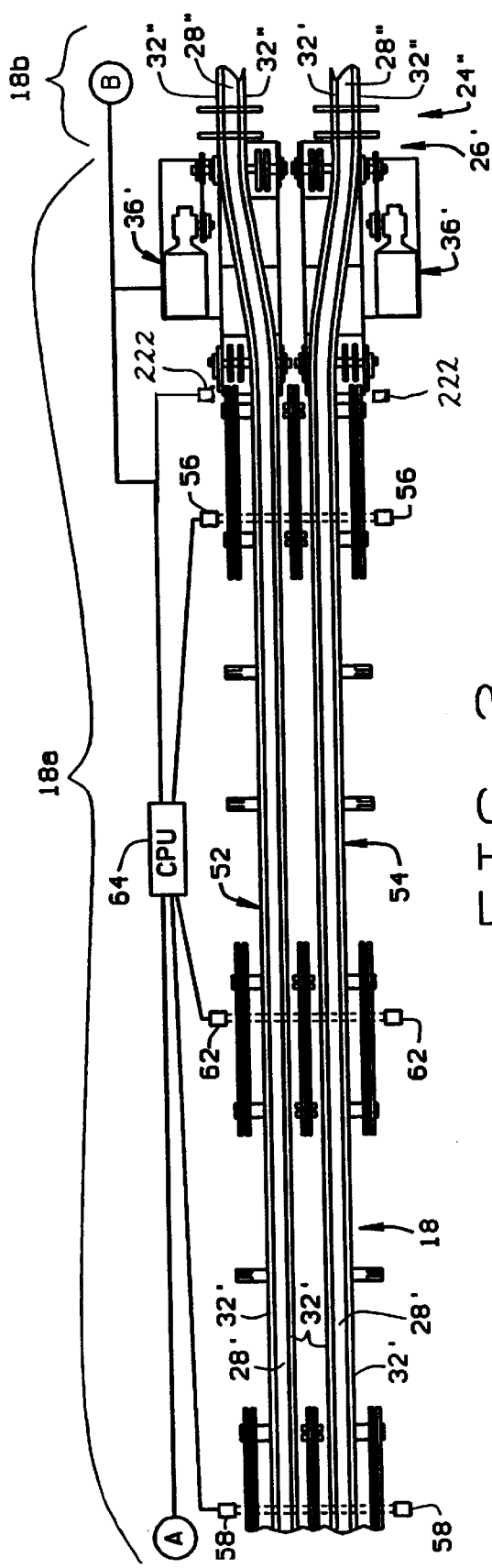
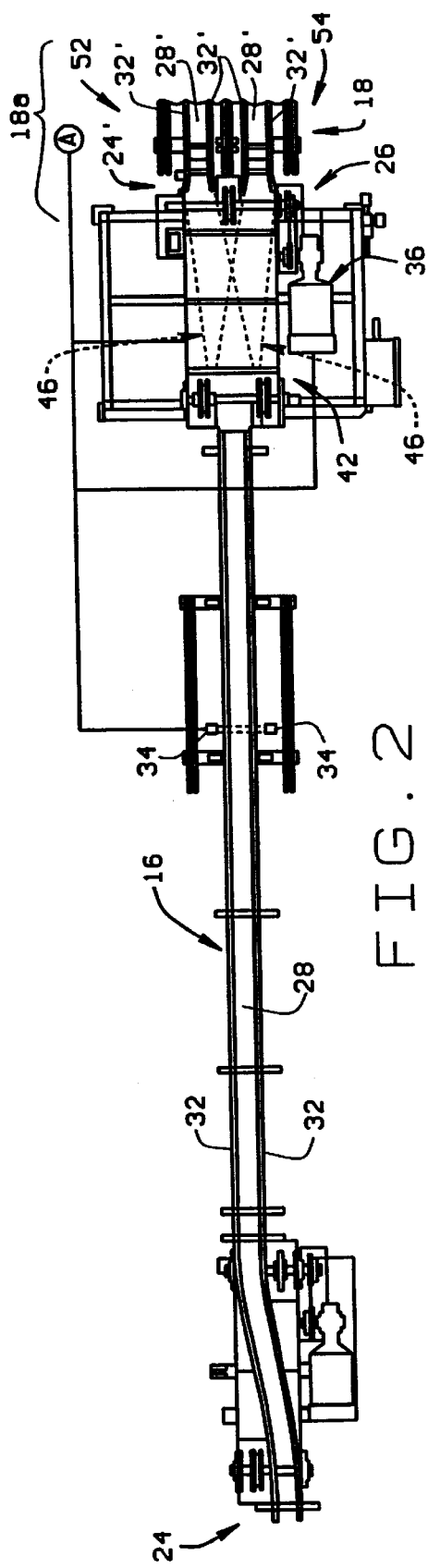

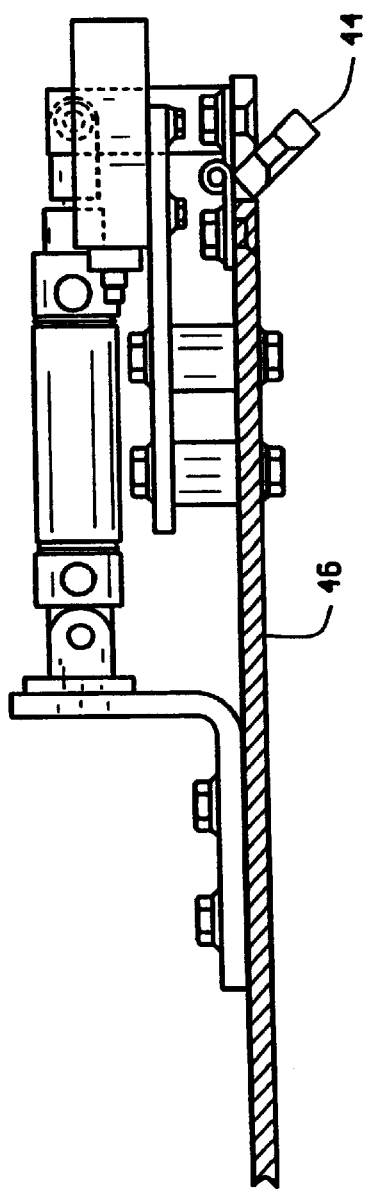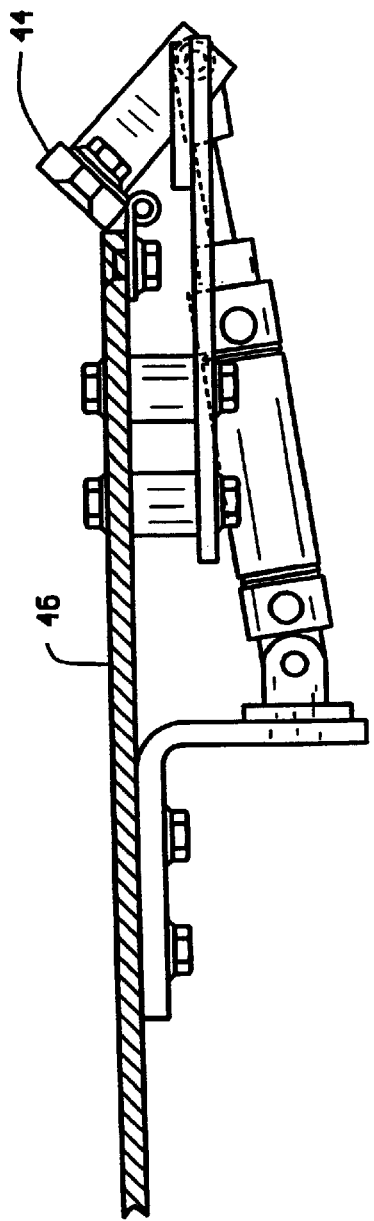
FIG. 8

APPARATUS FOR AVOIDING FALLING OVER OF OBJECTS CONVEYED ON A CONVEYOR SYSTEM

APPARATUS FOR AVOIDING FALLING OVER OF OBJECTS CONVEYED ON A CONVEYOR SYSTEM

This patent application is a continuation in part patent application of the application entitled "Conveyed Path Splitting Conveyor System", filed Jun. 9, 2000, assigned patent application Ser. No. 09/590,894 and presently pending.

BACKGROUND OF THE INVENTION

(1) Field of the Invention

The present invention pertains to a conveyor system comprising at least one upstream or infeed conveyor that conveys objects to a pair of downstream conveyors. More specifically, the conveyor system includes a diverter positioned between the upstream conveyor and first and second downstream conveyors that splits or switches a procession of objects conveyed by the upstream conveyor to one of the two downstream conveyors. The upstream or infeed conveyor includes improvements that enable it to monitor the number of objects being conveyed by the conveyor to the diverter and to monitor any spacings occurring between the number of objects to ensure that a predetermined number of objects will remain on the conveyor before the diverter when the gates of the diverter are closed where the number of objects accumulated on the conveyor when the gates are closed will act as a cushion for additional objects being conveyed on the upstream conveyor to impact with and prevent those additional objects from falling over. In addition, the upstream conveyor includes improvements that avoid the falling over of objects as the gate of the diverter is opened to direct a procession of objects held back by the diverter gate to one of the first and second downstream conveyors.

(2) Description of the Related Art

A typical split path conveyor system employs at least one upstream or infeed conveyor and at least two downstream conveyor lanes with a diverter positioned between the upstream conveyor and the downstream conveyor lanes. The diverter selectively directs a procession of objects conveyed by the upstream conveyor to one of the two downstream conveyor lanes. Split path conveyor systems of this type are typically used in conveyor systems that load a plurality of objects onto a-rectangular pallet. The conveyor system will employ an upstream conveyor that supplies a procession of objects to the two lanes of the downstream conveyor through a diverter that directs the objects to one of the two lanes of the downstream conveyor, and then could also employ two additional pairs of further downstream conveyor lanes that are supplied with the procession of objects from the pair of downstream conveyor lanes by a pair of diverters. The number of times the path of conveyed objects is split is usually determined by the number of rows of objects that are ultimately directed to the pallet being loaded with the objects. For example, if the pallet is loaded with four rows of objects, then the upstream conveyor will be split through a diverter to a pair of downstream conveyor lanes, and then each of the downstream conveyor lanes of the pair will be split by an additional pair of diverters to two pairs of further downstream conveyor lanes, resulting in four conveyor lanes conveying four rows of objects to the pallet being loaded.

In a belt conveyor slit path conveying system, the upstream conveyor typically comprises a belt conveyor that conveys objects in upright orientations in single file between pairs of guide rails that are positioned above the belt conveyor and extend the length of the belt conveyor. The upstream conveyor conveys the procession of objects between the guide rails to a diverter that selectively directs the procession of objects received from the upstream conveyor to one of at least two downstream conveyor lanes. Like the upstream conveyors, the downstream conveyor lanes, for example a first and second downstream conveyor lane, will continue to convey the objects in their upright orientations between a pair of guide rails positioned above a conveyor belt and extending along the length of the conveyor belt. In prior art split path belt conveyors, the pair of downstream conveyor lanes defined by the pair of guide rails would include side-by-side belts driven by the same motive source at the same speed, or would include a single wide belt that would have the two pairs of guide rails defining the two downstream conveyor lanes positioned above the single wider belt. This same wider belt would convey the objects delivered from the diverter down the lengths of both of the first and second downstream conveyor lanes depending upon which of the two pairs of guide rails the diverter directed the procession of objects to from the upstream conveyor.

In split path conveying systems comprising an upstream conveyor supplying a procession of objects to at least two downstream conveyor lanes through a diverter, each of the downstream conveyor lanes would typically employ some type of sensor along its length that would communicate with the diverter and control the operation of the diverter to direct the procession of objects conveyed by the upstream conveyor to one of the downstream conveyor lanes. For example, in a split path conveyor having first and second downstream conveyor lanes, a low sensor, either a mechanical sensor or an electric sensor, would be positioned toward the outlet end of each of the first and second downstream conveyor lanes of the pair to sense the presence or absence of objects on each of the first and second downstream conveyor lanes toward their outlet ends. In addition, each downstream conveyor lane would have a full sensor adjacent its inlet end and a midway sensor positioned along the length of the conveyor between its low sensor and full sensor. These three sensors positioned along each of the downstream conveyor lanes would give some indication as to the number of objects accumulated on each of the conveyor lanes that were available to be conveyed further down the conveyor system. The sensors would also provide signals to a central processing unit CPU of the conveyor system that would control the operation of the diverter to replenish or accumulate additional objects on each of the downstream conveyor lanes in response to signals of the sensors. When the low sensor of the first downstream conveyor lane would sense the absence of conveyed objects on the first downstream conveyor lane indicating a low number of conveyed objects accumulated -in the first downstream conveyor lane, it would send a signal to the CPU that in turn would control the diverter causing the diverter to switch to direct objects conveyed by the upstream conveyor to the first downstream conveyor lane and then causing the gates of the diverter holding back objects on the upstream conveyor to open. The diverter would include a sensor that would count objects conveyed through the diverter and the gate of the diverter would remain open until a number of objects was counted that would fill the space between the low sensor and the diverter. In a like manner, when the midway sensor or the full sensor of the first downstream conveyor lane would sense the absence of conveyed objects in the first downstream conveyor lane adjacent the sensor, it would send a signal to the CPU that would again control the diverter to direct a number of bottles to the first conveyor lane to fill the space between the midway sensor or the full sensor and the diverter, depending on which sensor signals were received by the CPU. After each cycle of the upstream conveyor supplying a number of bottles to either the first or second downstream conveyor lanes, the sensors and the CPU would then control the diverter to direct bottles to the downstream conveyor lane having the fewest accumulated bottles.

In conveyor systems of the type describe above, the efficiency of the conveyor system is dependent on the speed in which it conveys objects through the conveyor system. In a split path conveyor system of the type described above, the switching of the diverter between the first and second downstream conveyor lanes would detract from the efficiency of the conveyor system. In the switching of the diverter the gate of the diverter is first closed holding back objects on the upstream conveyor as the diverter switches from the first to the second downstream conveyor lane or from the second to the first downstream conveyor lane. When the switching operation is near completion the gates of the diverter are opened allowing objects on the upstream conveyor to be directed to either one of the first and second downstream conveyor lanes. Each time the diverter switches between the first and second conveyor lanes, the procession of objects being conveyed by the conveying system is stopped. Although the conveyance of objects is stopped for only a short period of time, multiplied by the number of times the diverter would switch between the first and second downstream conveyor lanes the time period that the procession of objects conveyed by the conveyor system is stopped due to the switching of the diverter becomes significant.

To make up for the lost time due to the switching operation of the diverter, increasing the speeds of the upstream conveyor and the first and second downstream conveyor lanes was considered for split path conveyor systems. However, in conveyor systems conveying lightweight objects, for example belt conveyor systems conveying empty blow-molded plastic bottles, the efficiency of the system could not be increased by simply increasing the speed of the conveyor belts. As bottles conveyed on one of the conveyor belts would come into contact with bottles accumulated at the outlet end of the same belt, the increased speed of the conveyor would cause the conveyed bottles to impact with the accumulated bottles with such a force that one or more of the conveyed bottles would be knocked backward from their upright orientations as a result of the impact. Therefore, to prevent the lightweight objects, for example blow-molded bottles, from falling over on impact along the conveyor system, the overall speed of the conveyor belts is limited and cannot be increased above the acceptable impact speed.

Controlling the speeds of the upstream conveyor and the conveyor of the first and second downstream conveyor lanes in split path conveyor systems was also considered to increase their efficiency. It was thought that the speed of the upstream conveyor and the speed of one of the first and second downstream conveyor lanes to which the diverter was directing bottles could be increased after the gate of the diverter-was opened and then gradually decreased before the bottles provided by the upstream conveyor to the downstream conveyor would impact with bottles already accumulated on the particular downstream conveyor lane. The gate of the diverter would then be closed and the diverter would be switched to the other downstream conveyor lane, the gates opened and the speeds increased to quickly supply bottles from the upstream conveyor to the other downstream conveyor lane. However, because both the first and second downstream conveyor lanes extended over one wide conveyor belt or two side-by-side belts driven by the same motive source, increasing the speed of one lane of the downstream conveyor to quickly supply it with a number of bottles from the upstream conveyor would also result in increasing the speed of the other lane of the downstream conveyor. This would result in uncontrollable bottle impact situations. For example, increasing the speed of the upstream conveyor and the first downstream conveyor lane to provide the first downstream conveyor lane with a sufficient number of bottles to fill the space between its low sensor and the diverter would also result in increasing the speed of the second conveyor lane. If a supply of bottles had been previously directed to the second conveyor lane by the diverter to fill the space between the midway sensor of the second conveyor and the diverter, the increased speed of the first downstream conveyor lane would also increase the speed of the second downstream conveyor lane causing the supply of bottles provided to the second downstream conveyor lane to impact with the bottles already accumulated on the second downstream conveyor lane at the increased speed. As a result, controlling the speeds of the downstream conveyor increasing its speed to quickly supply bottles to a conveyor lane and then decreasing the speed before the bottles supplied to the one particular conveyor lane impacted with bottles accumulated on the one particular conveyor lane was not seen as a solution to increasing the time efficiency of split path conveyor systems.

In increasing the speed at which processions of bottles were conveyed from the upstream conveyor through the diverter to one of the downstream conveyors, it was observed that when the gates of the diverter were closed to switch the diverter between the downstream conveyors, if only one or a small number of bottles conveyed by the upstream conveyor would impact with the closed gates some of the bottles would likely fall over. However, if the diverter gates were closed when a number of bottles were accumulated on the conveyor behind the diverter gates, the impact of additional bottles conveyed by the upstream conveyor with the accumulated number of bottles would cushion the impact and reduce the likelihood of bottles falling over. However, when the conveyor system is operated at increased speeds it is not always possible to maintain an accumulation of bottles on the upstream or infeed conveyor behind the diverter gates when the gates are closed to insure that individual bottles or small groups of bottles would not impact with the closed gates and possibly fall over.

In addition, as speeds are increased the force exerted by an accumulation of objects on a diverter gate holding back the objects on the surface of the moving conveyor would increase. This force could increase to the point where when the gate of the diverter is opened to direct the accumulated procession of objects down one of the downstream conveyors the opening of the gate could cause the lead object or objects to spring out of the gate and fall over in the conveyor path before the procession of objects. This potential for objects falling over is further increased where the conveyor section includes a vacuum for holding objects down on the conveyor surface. The addition of vacuum further increases the pressure created in the held back procession of objects behind the diverter gate.

What is needed to overcome the deficiencies in split path conveyor systems is an arrangement of sensors on the systems that provide a more accurate indication of the extent of accumulated conveyed objects on each of the downstream conveyors supplied by the upstream conveyor, and separate downstream conveyors with adjustable speed drive systems that are controlled by the CPU of the downstream conveyors to increase the speeds of the downstream conveyors in certain sensed conditions to quickly accumulate conveyed objects on the downstream conveyors and then decrease the speeds of the downstream conveyors to avoid a level of impact of conveyed objects with accumulated objects on the downstream conveyors that would cause some of the conveyed objects to be knocked over from their upright positions due to the impact.

Also what is needed to overcome the deficiencies in split path conveyor systems is a mechanism by which the gaps that appear between objects conveyed in a procession by the upstream conveyor to one of the two downstream conveyors can be monitored to insure that the occurrence of gaps between conveyed objects does not amount to a level where there is an insufficient number of objects or bottles conveyed by the upstream conveyor to act as a cushion when the gates of the diverter are closed to cushion the impact of gapped accumulated bottles traveling toward the gate and later arriving objects or bottles with the objects accumulated on the upstream conveyor behind the closed diverter gates. In addition, relieving the pressure of accumulated objects held behind the closed gates of the diverter just prior to the gates being opened would avoid the problem of one or more objects being propelled through the gates and potentially falling over in the conveyor path as the gates are opened.

SUMMARY OF THE INVENTION

The conveyor system of the invention in the illustrative embodiment to be described supplies four lanes of conveyed objects to a palletizer. However, the features of the conveyor system of the invention could be employed in supplying more than four lanes or fewer than four lanes of conveyed objects, and the conveyor system has applications other than supplying rows or lanes of objects to a palletizer. It should be understood that the description of the conveyor system of the invention as ultimately including four lanes of conveyed objects that are supplied to a palletizer is illustrative only and is not intended to limit the claimed features of the invention. Also, in the illustrative embodiment of the conveyor system, the conveyors are belt-type conveyors that convey empty plastic blow-molded bottles. However, the inventive features of the conveyor system could be employed in other types of conveyor systems, for example air conveyor systems, and may also be employed on conveyor systems in conveying other types of objects.

The illustrative embodiment of the conveyor system of the invention employs a single upstream or infeed conveyor, a pair of intermediate conveyors, and two pairs of downstream conveyors. Each of the conveyors is a belt type conveyor, for example a belt conveyor manufactured by Ouellette Machinery Systems, Inc. of Fenton, Mo. that employs a Rexnord® table top chain conveyor belt. Each of these conveyors have continuously running belts as the conveyor system is operated and have guide rails on opposite sides of the belts that direct the procession of bottles in single file along each of the conveyors. The bottles are conveyed in upright orientations of the bottles on the belts and the belt top surfaces are sufficiently smooth to enable the top surfaces to slide beneath the conveyed bottles when the procession of conveyed bottles is held back by a gate of the conveyor system allowing bottles to accumulate on the conveyor.

Each of the conveyors of the conveyor system is driven by a motive system, for example an electric motor and a speed shiftable power transmission system or an electric motor that can be controlled to vary its speeds, that is operable to run the conveyor at a plurality of different speeds and preferably at least a fast and a slow speed. The motive system of each conveyor can adjust the speed of the conveyor belt independently of the other conveyors.

The illustrative embodiment of the conveyor system employs three diverter assemblies with a first diverter assembly positioned between the upstream or infeed conveyor and the pair of intermediate conveyors and a pair of downstream diverter assemblies, second and third diverter assemblies, positioned between the pair of intermediate conveyors and the two pairs of downstream conveyors. In the preferred embodiment the diverter assemblies are diverter models BD250-2 or BD350-2 manufactured by Ouellette Machinery Systems, Inc. of Fenton, Mo. The diverters function like railroad track switches directing a procession of bottles supplied by one conveyor to the diverter to one of the two conveyors at the opposite side of the diverter. For example, the diverter between the upstream conveyor and the pair of downstream conveyors will selectively direct a procession of bottles conveyed by the upstream conveyor to one of the pair of downstream conveyors. The diverter has a pair of spaced, vertical panels that are switchable between the pair of intermediate conveyors so that the diverter may direct the procession of bottles conveyed by the upstream conveyor to either one of the pair of intermediate conveyors depending on sensed conditions of bottles accumulated on the pair of intermediate conveyors. The diverter also has a pair of gates, one mounted on each panel. The gates are operable between closed and open positions. In the closed positions they extend across the conveyor path and hold back bottles conveyed by the particular conveyor, allowing a number of bottles to accumulate on the conveyor behind the gate. In the opened positions they allow bottles to be conveyed past the gates. Each of the diverters is also provided with a sensor, either mechanical or electrical and preferably a photo sensor, that is mounted on the panels and communicates with a central processing unit (CPU) of the system to count the number of bottles conveyed through the diverter. The CPU uses this information in controlling the opening and closing of the gates of the diverter assembly.

In the preferred embodiment of the conveyor system each of the pair of intermediate conveyors and each of the two pairs of downstream conveyors have a plurality of sensors positioned along the lengths of the conveyors between their inlet and outlet ends. Preferably, at least two sensors are positioned along the lengths of each of the conveyors. In the illustrative example three sensors are used with a low sensor positioned adjacent the outlet end of the conveyor, a full sensor positioned adjacent the inlet end of the conveyor and a midway sensor positioned along the conveyor between the low sensor and full sensor. Preferably, the sensors employed are photo sensors that are capable of detecting the presence or absence of a bottle on the conveyor at the location of the sensor. In addition, the midway sensor of each conveyor is preferably positioned slightly toward the low sensor of each conveyor so that there is a greater distance between the midway sensor and the full sensor than between the midway sensor and the low sensor. The sensors of the conveyors communicate through a central processing unit (CPU) with the motive sources of the conveyors to control the changing of speeds of the individual conveyors depending on conditions sensed by the sensors along the lengths of the conveyors. In addition, the sensors of each conveyor communicate through the CPU with the diverter assemblies causing the gates of the diverter assemblies to open and close and causing the diverter panels of the diverter assemblies to switch between the conveyors supplied with bottles from the diverter assemblies depending on sensed conditions of the sensors. For example, if the sensors of a first conveyor of the pair of intermediate conveyors are all opened indicating the absence of bottles at the low sensor, the midway sensor and the full sensor, these sensors send a signal to the first diverter assembly causing the diverter panels of the diverter assembly to be switched to the first intermediate conveyor and causing the gate of the first diverter assembly to open so that a procession of bottles is directed from the upstream conveyor through the diverter assembly to the first conveyor of the pair of intermediate conveyors. The signal sent by all three of the sensors along the first intermediate conveyor indicates to the diverter assembly that the first intermediate conveyor can be supplied with a number of bottles that would fill the length of the first intermediate conveyor between the low sensor and the first diverter assembly. The counter photo sensor of the diverter assembly senses the bottles that pass by the gate and the CPU counts the bottles until a number of bottles that would fill the length of the first intermediate conveyor between the low sensor and the diverter assembly passes the gate, whereupon the diverter assembly will close the gate and switch the diverter panels to the second intermediate conveyor to supply bottles to the second intermediate conveyor as needed. After each cycle of the upstream conveyor supplying a number of bottles to either the first or second downstream conveyors, the sensors and the CPU would then control the diverter to direct bottles to the downstream conveyor having the fewest accumulated bottles. If the low sensor of the first intermediate conveyor senses the presence of bottles on the conveyor and the midway sensor and full sensor do not sense the presence of bottles, the sensors cause signals to be sent to the diverter assembly causing it to switch the diverter panels to direct bottles from the upstream conveyor to the first intermediate conveyor. The sensors also send signals to the diverter assembly causing the diverter assembly to open its gate and allow a number of bottles to pass through the gate that is sufficient to fill the space between the midway sensor and the first diverter assembly. With this number of bottles counted by the sensor of the diverter assembly, the gate is controlled to close and the diverter panels are switched to the second intermediate conveyor to supply bottles to that conveyor as needed. In addition, if while the gate is opened and the upstream conveyor is supplying a number of bottles to the first intermediate conveyor that will fill the space between the midway sensor and the full sensor and the low sensor opens indicating that the last of the bottles accumulated on the intermediate conveyor has passed the low sensor, the low sensor sends a signal to the CPU and the CPU counter counting bottles that pass the counter photo sensor will change from counting a number of bottles that will fill the space between the midway sensor and the diverter assembly to counting a number of bottles that will fill the space between the low sensor and the diverter assembly and then close the gate when this number of bottles has passed by the diverter sensor. By converting the number of bottles being counted by the CPU as the bottles are being counted the conveyor system saves time.

In addition, the conditions sensed by the low sensor, the midway sensor and the full sensor also control the speeds of each of the conveyors. For example, if each of the three sensors along the first intermediate conveyor sensed an open condition or the absence of bottles along the three sensor positions of the conveyor, the sensors would send a signal to the CPU that would then control the motive sources of the upstream conveyor and the first intermediate conveyor causing them to operate at slow speeds as the gate of the first diverter directing bottles to the first intermediate conveyor is opened and then to ramp up to high speeds to quickly supply the bottles from the upstream conveyor through the diverter to the first intermediate conveyor. When the counter sensor of the diverter determines that there are only a few bottles left to fill the space between the low sensor and the diverter, then the CPU controls the motive sources of the upstream conveyor and the motive source of the first intermediate conveyor to ramp down to slow speeds at which the gate was opened. This reduces the impact force of the conveyed bottles on the first intermediate conveyor with any accumulated bottles on the first intermediate conveyor that are downstream of the low sensor and thus avoids a level of impact of the bottles that would cause bottles at the end of the stream of conveyed bottles on the first intermediate conveyor from falling over. In a like manner, if the low sensor of the first intermediate conveyor senses the presence of bottles but the midway sensor and full sensor do not sense the presence of bottles, then the gate is opened to supply a number of bottles to the first intermediate conveyor that will fill the space between the midway sensor and diverter and the speed of the upstream conveyor and the speed of the first intermediate conveyor are controlled to increase from the low speed at the time the gate is opened to the high speed. The upstream conveyor and first intermediate conveyor are maintained at high speeds until the counter photo sensor at the diverter and the CPU detect that only a few bottles are left in the number of bottles supplied to the first intermediate conveyor at which point the speeds of the upstream conveyor and first intermediate conveyor are reduced to slow speeds to minimize the impact of the bottles conveyed to the first intermediate conveyor with the bottles already accumulated on the first intermediate conveyor and the slower moving bottles also enable the gates to close between the last bottle counted and the first bottle to be held. In this manner, bottles are quickly conveyed along each of the conveyors at high speed, but then the speed of conveyance is reduced to avoid the problem of impacting of bottles at high speeds causing the bottles at the end of a conveyed number of bottles from falling over.

Each of the pair of intermediate conveyors of the conveying system and the two pairs of downstream conveyors of the conveying system have at least two but preferably three photo sensors positioned along their lengths that emit signals that communicate with the CPU which controls the gates and the panels of the diverters that direct bottles to the conveyors and also controls the motive sources of each of the conveyors and the photo counters of each of the diverter assemblies as described above.

The upstream or infeed conveyor is also provided with sensors that sense gaps between adjacent bottles being conveyed by the infeed conveyor to the intermediate or downstream conveyors. This information is communicated to the CPU and the gaps for a number of bottles being conveyed by the upstream conveyor to the downstream conveyors is summed. The sum of the gaps is compared to an acceptable predetermined gap size for the number of bottles being conveyed to the downstream conveyors to insure that the summed gap does not become too large as to present the potential problem of too few bottles being accumulated before the first diverter gates to act as a cushion when the gates are closed. If the predetermined total gap is reached by the gaps sensed by the sensor and summed by the CPU the upstream conveyor will continue to operate at a reduced speed while an additional set number of bottles is conveyed past the sensor. If the gap count does not correct itself as the set number of bottles is conveyed past the sensor the CPU will control the upstream conveyor to close the gates of the first diverter to avoid the potential problem of too few bottles accumulated behind the gates to cushion the bottles traveling toward the gate and later arriving bottles impacting with each other on the conveyor and potentially falling over. With the gates closed the procession of bottles are again allowed to accumulate on the upstream conveyor for a predetermined time period, following which the gates are opened.

In order to insure that an accurate measurement is made of the gaps between bottles and the total summed gaps that pass by the sensor, the upstream conveyor employs a unique sensor arrangement of a first sender and receptor pair and a second sender and receptor pair that are positioned side by side on opposite sides of the conveyor to obtain an accurate gap count.

In addition, to avoid the problem of the pressure build up in a procession of bottles accumulated on the upstream conveyor and held back by the first diverter gate potentially projecting one or more bottles outwardly from the diverter gate as the gate is opened, the opening of the diverter gate is timed so that the upstream conveyor is allowed to decrease in speed just prior to the opening of the first diverter_gate, thereby reducing the pressure among the bottles accumulated behind the first diverter gate on the upstream conveyor. Furthermore, when a vacuum system is employed with the upstream conveyor to assist in holding down conveyed bottles on the top surface of the conveyor, the vacuum created by the vacuum system drawing bottles down onto the upstream conveyor will decrease a short time before the opening of the first diverter gate to further reduce the pressure built up among bottles accumulated behind the first diverter gate and thereby avoid the problem of one or two bottles projecting forwardly through the gate as the gate is opened and potentially falling over.

The split path conveying system of the invention constructed in the manner described above significantly increases the time efficiency of the split path conveyor system over those of the prior art.

BRIEF DESCRIPTION OF THE DRAWINGS

Further features of the invention are set forth in the following detailed description of the preferred embodiment of the invention and in the drawing figures wherein:

FIG. 2 is a plan view of the upstream conveyor of the conveyor system and the first diverter assembly as well as the inlet ends of the first and second intermediate conveyors;

FIG. 3 is a plan view of a portion of the first and second intermediate conveyors;

FIG. 8 is a partial plan view of the diverter assembly panels and gates;

DETAILED DESCRIPTION OF THE PREFERRED EMBODIMENT

Figure 1:
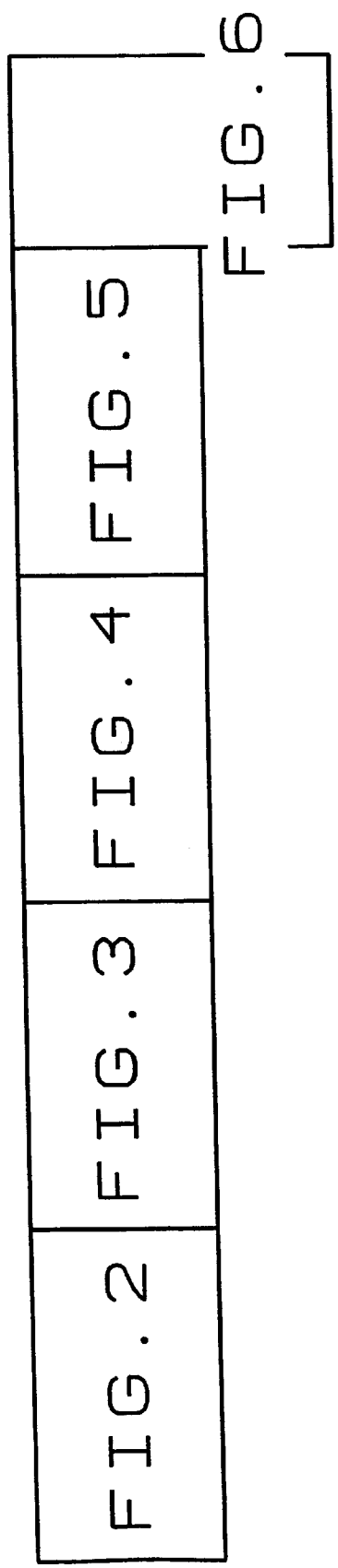
FIG. 1 is a schematic block representation of how FIGS. 2 through 6 of the drawings are arranged together to show a plan view of an entire conveyor systems of the preferred embodiment of the invention.
Figure 4:
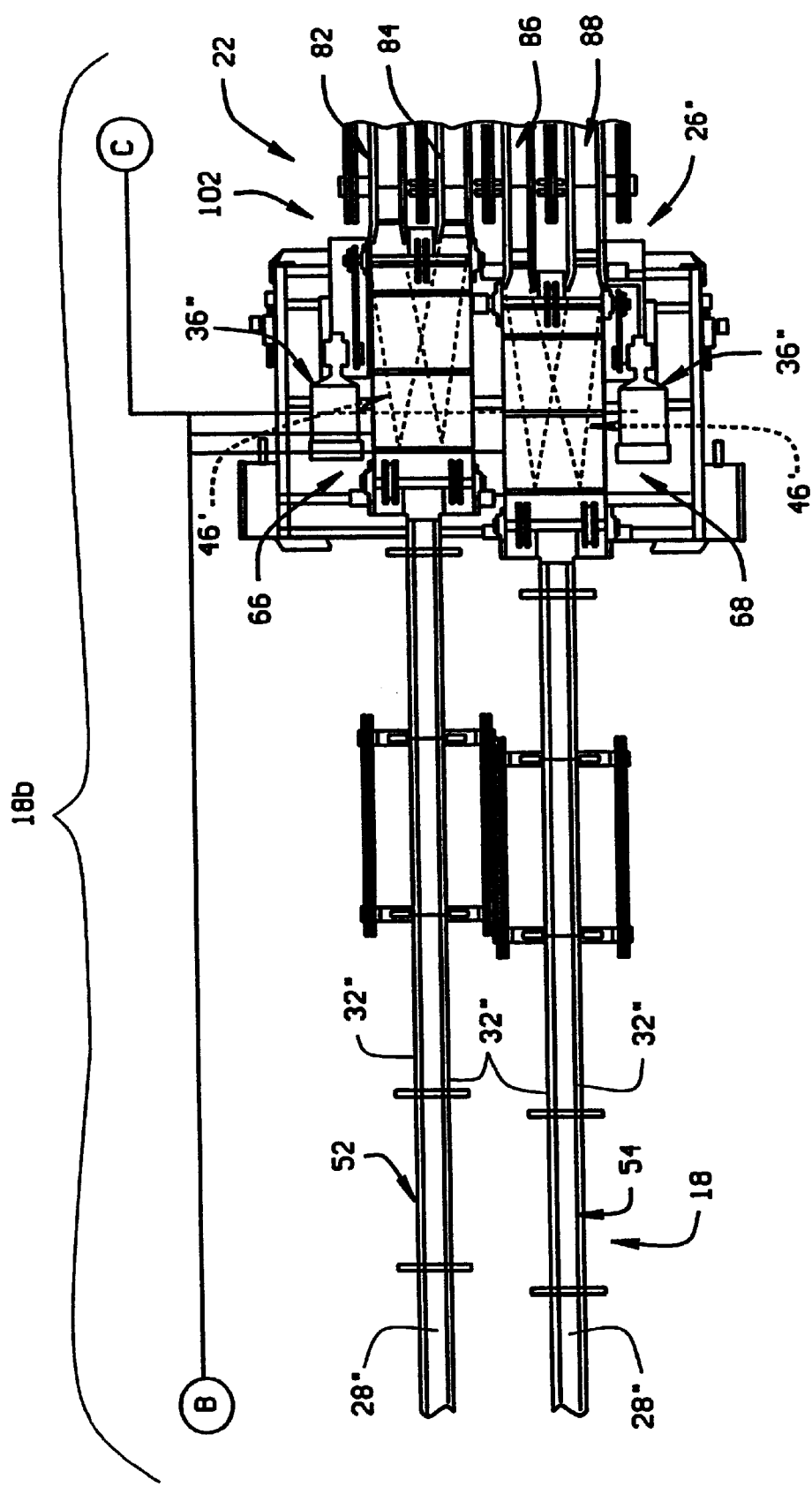
FIG. 4 is a plan view of the outlet ends of the first and second intermediate conveyors as well as the second and third diverter assemblies of the conveyor system and the inlet ends of the first and second pairs of downstream conveyors.
Figure 5:
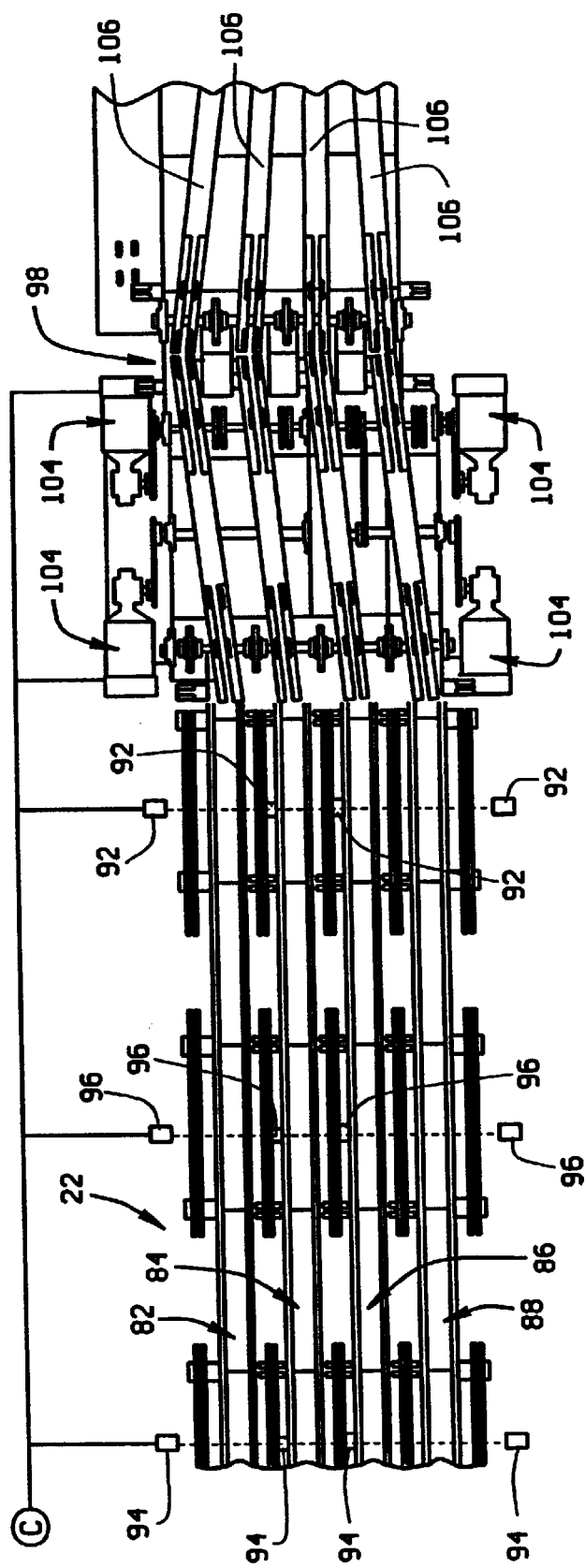
FIG. 5 is a plan view of portions of the first and second pairs of the downstream conveyors.
Figure 6:
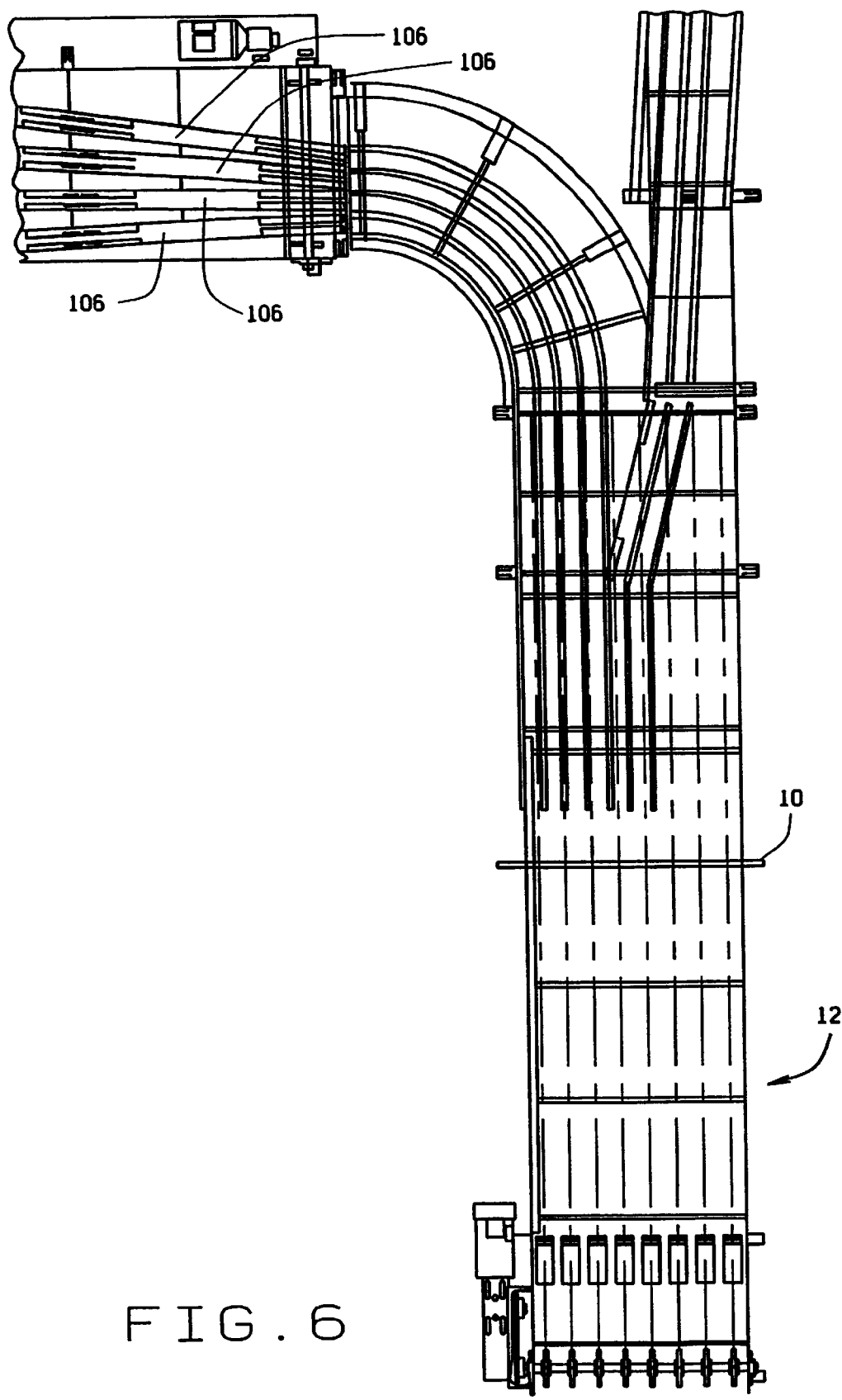
FIG. 6 is a plan view of the downstream conveyors merging into a stop gate and a row former that prepares rows of bottles conveyed by the conveyor system for arrangement on pallets.

In the drawing figures, FIG. 1 shows a block diagram arrangement of how FIGS. 2 through 6 are arranged to show an embodiment of the conveyor system of the present invention. The illustrative embodiment of the conveyor system shown in FIGS. 2 through 6 conveys a procession of objects, in the illustrative embodiment empty blow-molded plastic bottles, from left to right in each of the figures to a bottle stop gate 10 shown in FIG. 6 that accumulates four rows of bottles behind the stop gate and that selectively opens and closes to supply the accumulated rows of bottles to a row former 12 that ultimately arranges the rows of bottles in layers on a pallet (not shown). The use of the conveyor system of the invention to provide four rows of bottles that are accumulated by the stop gate 10 for the row former 12 is only one illustrative embodiment of the conveyor system of the invention. The features of the conveyor system of the invention could be employed in supplying more than four rows of bottles, or could be used to supply fewer than four rows of bottles. The features of the conveyor system could also be used to split one infeed conveyor into three downstream conveyors and then further split the conveyors to supply any even or odd numbers of rows of bottles. In addition, the conveyor system has applications other than supplying rows of bottles to a palletizer. It should be understood that the description of the conveyor system of the invention as ultimately providing four rows of bottles to a machine where the bottles are accumulated in the four rows is illustrative only and is not intended to limit the claimed features of the invention. Also, in the illustrative embodiment of the conveyor system, the conveyors are belt type conveyors that convey empty plastic blow-molded bottles. However, the inventive features of the conveyor system could be employed in other types of conveyor systems, for example air conveyor systems, and may also be employed on conveyor systems that convey other types of objects.

The conveyor system of the invention is comprised of known types of conveyors, diverter assemblies, motive systems and photo sensors that are schematically represented in the drawing figures to simplify the description of the conveyor system. The novel arrangement of these known component parts of the conveyor system and the manner in which they interact with each other enables the conveyor system to split a single path of conveyed plastic bottles at the input of the conveyor system into four lanes of accumulated plastic bottles at the output of the conveyor system in a more time efficient manner than that of prior art split path conveyor systems.

The illustrative embodiment of the conveyor system of the invention shown in FIGS. 2 through 6 employs a single upstream or infeed conveyor 16, a pair of intermediate conveyors 18, and two pairs of downstream conveyors 22 for a total of four downstream conveyors. Each of the conveyors is a belt type conveyor, for example a belt conveyor manufactured by Ouellette Machinery Systems, Inc. of Fenton, Mo. that employs a Rexnord® table top chain conveyor belt. Referring to FIG. 2, the upstream conveyor 16 has a length between its inlet end 24 and its opposite outlet end 26. A moving table top surface or belt surface 28 extends the entire length of the conveyor. The belt surface 28 runs continuously during the operation of the conveyor, but its speed changes as will be explained. Guide rails 32 are positioned along the opposite sides of the belt surface 28 and are spaced apart from each other a distance that is slightly larger than the width of the objects conveyed by the conveyor, in this case empty plastic blow-molded bottles. This spacing of the guide rails 32 directs a procession of bottles conveyed by the upstream conveyor 16 in single file along the length of the conveyor. The bottles are conveyed in upright orientations of the bottles on the belt surface 28 and the belt surface is sufficiently smooth to enable the surface to slide beneath the conveyed bottles when the procession of conveyed bottles is held back on the upstream conveyor 16 when accumulating bottles on the conveyor. An infeed sensor 34, a mechanical or electrical sensor but preferably a photo sensor, is positioned at a predetermined location along the upstream conveyor 16. The infeed sensor 34 senses the presence or absence of bottles accumulated on the conveyor back to the location of the sensor. The position of the sensor ensures there are enough bottles accumulated on the upstream conveyor 16 to act as a cushion that absorbs the force of impact of other bottles conveyed on the upstream conveyor that impact with the bottles held back on the conveyor to the infeed sensor 34 or beyond.

The upstream conveyor 16 is driven by a motive source 36. The motive source is comprised of an electric motor and a speed shiftable power transmission system, for example a belt and pulley system with electrically activated clutches, or an electric motor that can be controlled to operate at various speeds. This enables the motive system 36 to drive the upstream conveyor 16 at a plurality of different speeds, and preferably at least three speeds.

Figure 7:
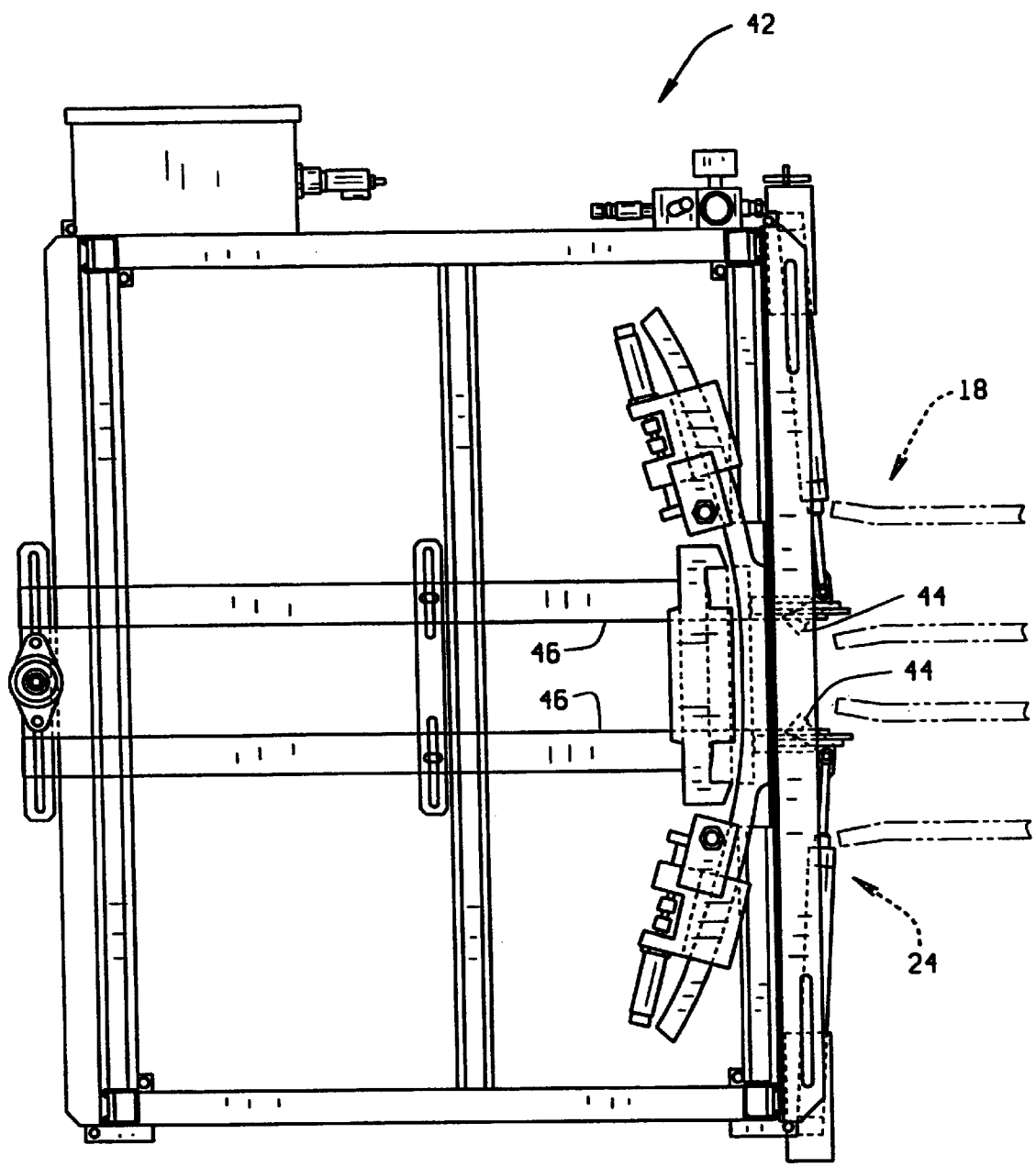
FIG. 7 is a top plan view of one of the diverter assemblies.
Figure 9:
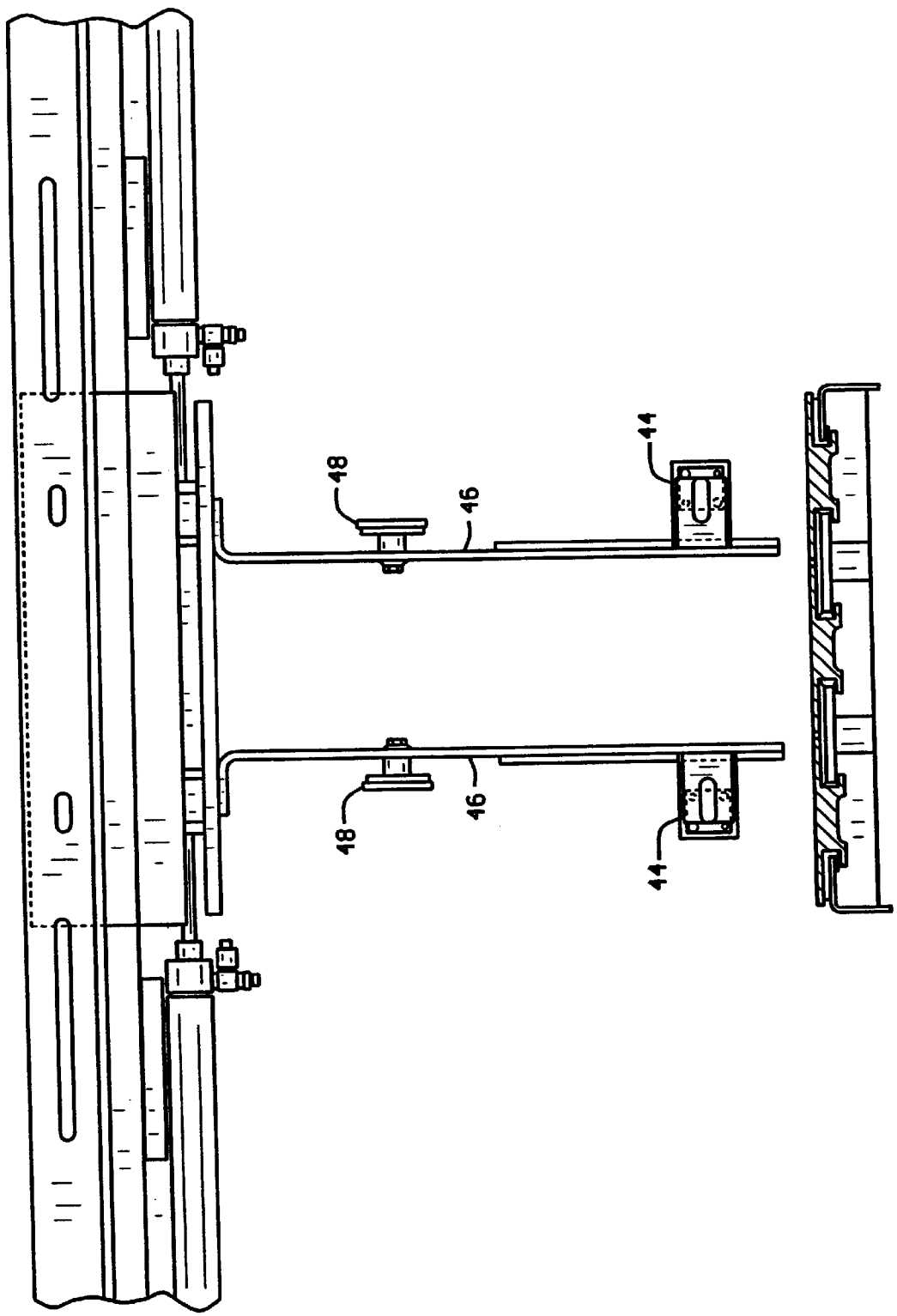
FIG. 9 is a partial end elevation view of the diverter assembly panels and the gates and counter sensor.

Positioned at the outlet end 26 of the upstream conveyor 16 is a diverter assembly 42. In the preferred embodiment of the conveyor system, the diverter assembly 42 is a diverter model BD250-2 or model BD350-2 manufactured by Ouellette Machinery Systems, Inc. of Fenton, Mo. Diverter assemblies of this type are known in the art and its general construction is shown in FIGS. 7, 8 and 9. The diverter assembly 42 is basically comprised of gates 44 mounted on a pair of switchable diverter panels 46. The gates 44 are pneumatically operated and pivot on outlet ends of the panels between closed and opened positions shown in FIGS. 8 and 9, respectively. In the closed position of the gates they extend into the conveyor path of bottles being conveyed by the upstream conveyor 16 and hold back bottles conveyed by the conveyor, allowing a number of bottles to accumulate on the conveyor behind the gates 44 or to the left of the gates as viewed in FIG. 2. In the opened position the gates 44 allow bottles to be conveyed by the upstream conveyor 16 past the gates and through the diverter panels 46. The diverter panels 46 function like railroad track switches directing a procession of bottles conveyed by the upstream conveyor 16 through the diverter assembly 42 to one of the two intermediate conveyors 18. The two switched positions of the diverter panels 46 are represented by the parallel pairs of dashed lines shown in the diverter assembly 42 in FIG. 2. The diverter panels 46 are pneumatically operated and are switchable between the two positions of the panels represented by the dashed lines in FIG. 2 communicating the upstream conveyor 16 with either one of the pair of intermediate conveyors 18. The diverter assembly 42 is also provided with a counter photo sensor 48 mounted on the outlet ends of the diverter panels 46. The sensor 48 could be either mechanical or electrical but preferably is a photo sensor that senses bottles conveyed past the counter sensor 48 as they are directed through the diverter assembly panels 46. The counter sensor 48 emits signals for the number of bottles conveyed through the diverter assembly 42 and this information is used in controlling the opening and closing of the diverter gates 44 as well as the speeds of the conveyors as will be explained.

The pair of intermediate conveyors 18 each have an inlet section 18a and an outlet section 18b. Each inlet section 18a functions to quickly supply bottles to its outlet section 18b to keep bottles accumulated on its outlet section 18b while minimizing the impact of bottles supplied by the inlet section 18a with bottles that may be accumulated on the outlet section 18b as well as on the inlet section 18a. The intermediate conveyor sections 18a and 18b are each constructed in substantially the same manner as the upstream conveyor and component parts of the intermediate conveyor sections are identified by the same reference numbers as the component parts of the upstream conveyor followed by a prime (') and a double prime ("). Like the upstream conveyor, each of the intermediate conveyor sections 18a, 18b has an inlet end ', 24" and an opposite outlet end 26', 26", a belt surface 28', 28", guide rails 32', 32" and a motive source 36', 36". However, each of the first 52 and second 54 intermediate conveyors differs from the upstream conveyor 16 in that they include a plurality of sensors positioned along their inlet section 18a lengths between their inlet 24' and outlet 26' ends. Preferably, the three sensors are positioned along the inlet section lengths of the intermediate conveyors 52, 54 with each conveyor having a low sensor 56 positioned toward the outlet end 26' of the conveyor inlet section 18a where it will sense as low supply of bottles accumulated on the conveyor section, a full sensor 58 positioned toward the inlet end 24' of the conveyor section where it will sense a full supply of bottles accumulated on the conveyor section and a midway sensor 62 positioned along the length of each conveyor inlet section between the low sensor and the full sensor. The sensors 56, 58, 62 can be mechanical or electrical sensors but are preferably photo sensors that are capable of detecting the presence or absence of a bottle on the inlet sections of each of the intermediate conveyors 52, 54 at the location of the sensor. In addition, the midway sensors 62 of the intermediate conveyors 52, 54 are positioned slightly toward the low sensors 56 of the conveyors so that there is a greater distance between the midway sensor 62 and the full sensors 58 of the conveyors than between the midway sensors 62 and the low sensors 56.

The sensors 56, 58, 62 of each of the intermediate conveyors 52, 54 communicate through a central processing unit 64 with the motive source 36 of the upstream conveyor as well as with the infeed sensor 34, the diverter assembly gates 44, the diverter panels 46 and the counter sensor 48 of the diverter assembly 42. The CPU 64 is programmed to control the operation of the motive source 36 of the upstream conveyor 16 adjusting the speed of the motive source and thereby the speed of the conveyor as well as the opening and closing of the first diverter assembly gates 44, the switching of the diverter panels 46 between their two positions and the resetting of the CPU counter which communicates with the counting photo sensor 48 to count a particular number of bottles that pass through the diverter assembly 42.

At the outlet ends 26" of the outlet sections of the intermediate conveyors 18 are second 66 and third 68 diverter assemblies that are substantially identical to the first diverter assembly 42 described earlier. Because the second 66 and third 68 diverter assemblies include the same component parts as the first diverter assembly 42, those component parts are identified by the same reference numbers followed by a prime ('). Like the first diverter assembly 42, each of the second 66 and third 68 diverter assemblies include a gate 44', diverter panels 46' and a counter photo sensor 48'. Each of these component parts of the second 66 and third 68 diverter assemblies operates in the same manner as those of the first diverter assembly 42.

The second diverter assembly 66 operates to direct a procession of bottles conveyed by the first intermediate conveyor 52 to one of the pairs of downstream conveyors 22 or to a first 82 or second 84 of the downstream conveyors. The third diverter assembly 68 operates to direct a procession of bottles conveyed by the second intermediate conveyor 54 to the second pair of downstream conveyors 22 or to the third 86 or fourth 88 downstream conveyor. Each of the four downstream conveyors 82, 84, 86, 88 are duplications of the inlet sections of the intermediate conveyors 52, 54 and like the intermediate conveyors, each includes a low photo sensor 92, a full photo sensor 94 and a midway photo sensor 96. Like the inlet sections of the intermediate conveyors, the low photo sensor 92 of the downstream conveyors are positioned toward the outlet ends 98 of the conveyors, the full photo sensors 94 of the downstream conveyors are positioned toward the inlet ends 102 of the conveyors, and the midway sensors 96 are positioned along the lengths of the conveyors between the low sensors and full sensors. Like the inlet sections of the intermediate conveyors, the midway sensors 96 are positioned slightly toward the low sensors 92 so that there is a greater distance between the midway sensors 96 and the full sensors 94 than between the midway sensors 96 and the low sensors 92. The sensors of each of the downstream conveyors communicate through the central processing unit 64 with the motive sources 104 of the conveyors to control their speeds. In addition, the sensors of the downstream conveyors also communicate with the second 66 and third 68 diverter assemblies, and more specifically the gates 44', diverter panels 461 and the counter sensors 48'of the two diverter assemblies through the central processing unit 64 of the conveyor system. The outlet ends 98 of the downstream conveyors define the end of the conveyor system of the invention and communicate with four outlet lanes 106 that accumulate bottles received from the downstream conveyors in four rows that are routed to the bottle stop gate 10 and the row former 12, described earlier.

The operation of the intermediate conveyors 18 is basically duplicated by each of the downstream conveyors 82, 84, 86, 88 and therefore only the operation of the two intermediate conveyors 52, 54 and in particular the inlet section of the first intermediate conveyor 52 will be described in detail.

In operation of the conveyor system of the invention, the upstream conveyor 16 receives a procession of objects, in this example empty, plastic blow-molded bottles, from a source of the bottles (not shown) at the inlet end 24 of the conveyor. In operation of the conveyor system the upstream conveyor 16, as well as the intermediate conveyors 18 and the downstream conveyors 24 are continuously running and only their speeds are changed as will be described. The procession of bottles are conveyed along the upstream conveyor 16 to the right as shown in FIG. 2 to the first diverter assembly 42 and are held back by the gates 44 when the gates are in their closed positions. The bottles can accumulate on the upstream conveyor 16 with the gates 44 closed and the conveyor will continue to run with the belt surface 28 of the conveyor sliding beneath the bottom surfaces of the upright oriented bottles accumulated behind the first diverter gates 44. The infeed sensor 34 positioned along the upstream conveyor 16 ensures that a certain number of bottles are accumulated on the upstream conveyor between the diverter gates 44 and the infeed sensor 34. The infeed sensor 34 sends a signal to the CPU 64 that indicates the presence or absence of bottles accumulated on the infeed conveyor behind the gates 44 at the position of the infeed sensor 34. The CPU in turn controls the operation of the first diverter gates 44 preventing the gates from opening at any time the infeed sensor 34 senses the absence of bottles accumulated on the infeed conveyor. This maintains a certain number of bottles between the infeed sensor 34 and the gates 44 that function as a cushion for subsequent bottles that are supplied to the inlet end 24 of the upstream conveyor that impact with the accumulated bottles on the upstream conveyor. The force of impact of the subsequent conveyed bottles is distributed through all of the bottles that are accumulated between the diverter gates 44 and the infeed sensor 34 and in this manner the force of impact is lessened to the extent that the impact will not cause the subsequent impacting bottle to fall over on the infeed conveyor. Thus, by the infeed sensor 34 maintaining a certain number of bottles accumulated on the upstream conveyor 16 between the diverter gates 44 and the infeed sensor 34, any subsequent bottles that are conveyed by the upstream conveyor and impact with the accumulated bottles on the upstream conveyor will remain in their upright orientations. When the gates 44 of the first diverter are opened to supply a procession of bottles to either of the intermediate conveyors 18, should the infeed sensor 34 detect the absence of a bottle at its position along the upstream conveyor, for example the absence is sensed for a fraction of a second, the gates 44 of the first diverter will immediately close once the photo sensor 48 of the first diverter has sensed that a bottle has completely passed the gates to ensure that the gates 44 do not close and pinch a bottle between the gates as they are closed. Because the gates 44 will allow one or two bottles to pass by the gates before they are closed, the infeed sensor 34 is positioned along the upstream conveyor a sufficient distance to ensure that there are enough bottles accumulated between the diverter gates 44 and the infeed sensor 34 to function as a cushion even when one or two of the accumulated bottles are allowed to pass by the gates before the gates are closed.

The photo sensors 56, 68, 62 along the first 52 and second 54 intermediate conveyors sense the presence or absence of bottles accumulated on the inlet sections 18a of the intermediate conveyors and provide signals to the central processing unit 64 that are indicative of the sensed presence or absence of a bottle at the particular location of the photo sensors. The central processing unit 64 uses this information provided by the intermediate conveyor sensors 56, 58, 62 to control the operation of the first diverter assembly 42 and in particular the gates 44 and diverter panels 46 of the diverter assembly. In addition, the central processing unit 64 uses the information provided by the sensors 56, 58, 62 to control the speed of the motive source 36 of the upstream conveyor 16 as well as the speed of the motive source 36' of either the first or second intermediate conveyor inlet section 18a being supplied with bottles by the first diverter.

For example, if the photo sensors 56, 58, 62 of the first intermediate conveyor 52 are all open or do not detect the presence of a bottle adjacent the photo sensor locations, these photo sensors send signals to the CPU 64 that indicate at least a portion of the first intermediate conveyor between the low sensor 56 and the first diverter assembly 42 does not contain any accumulated bottles. The remainder of the first intermediate conveyor 52 including the outlet section 18b and the portion of the inlet section 18a downstream of the low photo sensor 56, or between the low photo sensor 56 and the second diverter 66, could contain an accumulation of bottles or could also be absent of accumulated bottles. Regardless, the CPU 64 will send a signal to the first diverter assembly 42 causing it to switch the diverter panels 46 to direct bottles received from the upstream conveyor 16 to the inlet section 18a of the first intermediate conveyor 52 and then to open the gates 44 for a period of time that would allow a number of bottles sufficient to fill the space between the low sensor 56 and the first diverter assembly 42 to pass through the diverter assembly 42. The bottles that pass through the diverter assembly 42 are counted by the CPU and the count photo sensor 48 until the pre-determined number passes through the diverter assembly at which point the conveyors slow down and the gates 44 are closed. This allows the number of bottles that will fill the space between the low sensor 56 and the first diverter assembly 42 to be accumulated on the first intermediate conveyor 52. If bottles were previously accumulated on the outlet section 18b of the first intermediate conveyor between the low sensor 56 and the second diverter assembly 66, then this last supply of bottles sent to the first intermediate conveyor would fill the conveyor. If the outlet section 18b of the first intermediate conveyor 52 had no bottles accumulated between the low sensor 56 and the second diverter assembly 66, then the number of bottles supplied to the first intermediate conveyor 52 by the first diverter assembly 42 will be conveyed by the first intermediate conveyor completely past all three sensors 56, 58, 62 to the outlet section 18b of the first intermediate conveyor 52 and the second diverter assembly 66. The three sensors would again sense the absence of bottles between the low sensor 56 and the first diverter 42 and again send signals to the CPU that would cause the CPU to control the first diverter assembly 42 to again open its gates 44 and channel a number of bottles to the first intermediate conveyor 52 that would fill the space between the low sensor 56 and the first diverter 42 provided that during the time the bottles are being supplied by the first diverter to the first intermediate conveyor the sensors of the second intermediate conveyor do not open indicating that it needs bottles.

If the low sensor 56 of the first intermediate conveyor 52 senses the presence of bottles on the inlet section 18a of the conveyor and the midway sensor 62 and full sensor 58 do not sense the presence of bottles, the sensors send signals to the CPU 64 that indicate a number of bottles have been accumulated on the first intermediate conveyor 52 at least to the position of the low sensor 56 along the conveyor. However, the bottles could also be accumulated back behind the low sensor 56 to a position just downstream of the midway sensor 62 of the conveyor where they would not be detected by the midway sensor. Therefore, the central processing unit 64 receiving these signals from the three sensors will control the first diverter assembly directing the diverter panels 46 of the diverter assembly to supply bottles conveyed by the upstream conveyor 16 to the first intermediate conveyor 52 and then opening the gates 44 of the diverter 42. The central processing unit 64 will also receive signals from the counter photo sensor 48 of the first diverter assembly 42 as bottles pass the sensor and count a number of bottles sufficient to fill the space between the midway sensor 62 and the first diverter assembly 42. Once this number of bottles is counted, the gates 44 are controlled to close and the diverter panels 46 are controlled to switch over to the second intermediate conveyor 54 to supply bottles to that conveyor if the sensors of the second conveyor are open, provided that during the time the bottles are being supplied to the first intermediate conveyor the low sensor does not open and the count of bottles being supplied is converted to a larger number of bottles in the manner explained below. In a like manner, if only the full sensor 58 is open indicating the absence of bottles on the first intermediate conveyor at the full sensor, and if none of the sensors or only the full sensor of the second intermediate conveyor 54 is opened, then the first diverter assembly will be controlled to direct a number of bottles to the first intermediate conveyor to fill the space between the full sensor 58 and the first diverter assembly 42.

In addition, if the midway and full sensors of the first intermediate conveyor 52 sense the absence of bottles and the CPU controls the gates 44 of the first diverter assembly 42 to open and controls the upstream conveyor 16 to supply a number of bottles to the first intermediate conveyor 52 to fill the space between the midway sensor 62 and the first diverter 42, and the low sensor 56 along the first intermediate conveyor 52 then opens indicating that the last of the bottles previously accumulated on the intermediate conveyor 52 has passed the low sensor 56, the low sensor signal sent to the central processing unit 64 will cause it to reset the CPU counter to change between the number of bottles that will fill the space between the midway sensor 62 and the first diverter assembly 42, to the number of bottles that will fill the space between the low sensor 56 and the first diverter assembly and will then close the gates 44 when this number of bottles has passed by the diverter counter sensor 48. By converting the number of bottles being counted by the CPU from a smaller number to a larger number as the bottles are being counted, a switch of the divert and its s of conveying time are eliminated and more uninterrupted conveying time is gained, thus improving time efficiency of the conveyor system.

In addition, the spacing between the full sensor 58 and the midway sensor 62 is specifically determined to be slightly larger than the spacing between the midway sensor 62 and the low sensor 56 to avoid sending inaccurate signals to the central processing unit 64 that would represent that no bottles are accumulated on the intermediate conveyor between the midway sensor 62 and the low sensor 56. When the central processing unit controls the first diverter assembly 42 to supply a number of bottles to the first intermediate conveyor 52 to fill the space between the midway sensor 62 and the first diverter assembly 42 as described above, this number of bottles conveyed along the first intermediate conveyor 52 cannot fit between the midway sensor 62 and the low sensor 56 without being detected by one or both of the sensors due to the smaller spacing between the midway sensor and low sensor than that between the full sensor and the midway sensor. Thus, the three sensors 56, 58, 62 of the intermediate conveyor 52 will not provide an inaccurate signal to the central processing unit 64 indicating that none of the sensors detect the presence of bottles on the first intermediate conveyor 52 when a number of bottles supplied to the intermediate conveyor to fill the space between the midway sensor 62 and the first diverter assembly 42 has moved further down the intermediate conveyor to a position between the midway sensor 62 and the low sensor 56.

In addition, the conditions sensed by the low sensor 56, the midway sensor 62 and the full sensor 58 also control the speed of the motive sources 36 of the upstream conveyor 16 and the speeds of the motive sources 36' of the first 52 and second 54 intermediate conveyors. For example, if each of the three sensors 56, 58, 62 positioned along the first intermediate conveyor 52 sensed an open condition or the absence of bottles along the three sensor positions of the conveyor, the sensors would send these signals to the central processing unit 64 which would control the motive source 36 of he upstream conveyor 16 and the motive source 36' of the inlet section 18a of the first intermediate conveyor to both operate at first a low speed, for example 100 feet per minute as the gates 44 of the diverter assembly 42 are opened. After opening of the gates 44, the speeds of the upstream conveyor 16 and the inlet section 18a of the first intermediate conveyor 52 would be controlled to increase up to a high speed, for example 240 feet per minute. This increased speed would quickly supply the bottles from the upstream conveyor 16 to the inlet section 18a of the first intermediate conveyor 52 through the diverter 42. When the CPU, receiving counting signals from the counter sensor 48 of the first diverter assembly 42, determines that there are only a few bottles left to be supplied to the bottle count by the upstream conveyor 16 to fill the space between the low sensor 56 and the first diverter assembly 42, then the CPU will control the motive sources of the upstream conveyor and the first intermediate conveyor to decrease the speeds of the conveyors, for example back to a slower speed of 90 feet per minute, and then close the gates after the predetermined number of bottles had passed. After the gates 44 are closed the speeds can then be increased to 100 feet per minute in preparation of opening the gates again. This reduces the impact force of the bottles conveyed on the upstream conveyor 16 toward the inlet section 18a of the first intermediate conveyor 52 with any accumulated bottles that may be on the outlet section 18b or the inlet section 18a of the first intermediate conveyor that are downstream of the low sensor 56 and/or downstream of the midway sensor 62, and thus avoids a level of impact of the bottles that would cause bottles at the end of the stream of bottles conveyed from the upstream conveyor 16 from falling over. It also minimizes the impact of bottles conveyed on the upstream conveyor 16 with the closed gates 44.

In a like manner, if the low sensor 56 of the first intermediate conveyor 52 senses the presence of bottles accumulated on the conveyor but the midway sensor 62 and the full sensor 58 do not sense the presence of bottles, then the central processing unit 64 will control the speeds of the upstream conveyor and the inlet section 18a of the first intermediate conveyor 52 setting them at slow speeds as the gates 44 of the first diverter assembly are opened. After the gates are opened, the central processing unit 64 increases the speeds of the upstream motive source 36 and the motive source 36' of the inlet section of the first intermediate conveyor 52 from the slow speeds at the time the gates are opened to the high speeds. The gates 44 remain opened as described earlier to supply a number of bottles from the upstream conveyor 16 to the first intermediate conveyor 52 that will fill the space between the midway sensor 62 and the first diverter assembly 42. Both conveyors are maintained at the high speeds until the CPU determines from the signals supplied by the counter sensor 48 of the first diverter assembly 42 that only a few bottles are left in the number of bottles supplied to the first intermediate conveyor 52 at which point the central processing unit 64 decreases the speeds of the upstream conveyor 16 and the inlet section 18a of the first intermediate conveyor 52 back to the slow speeds before the gates 44 are closed. This minimizes the impact of the bottles conveyed from the upstream conveyor 16 to the first intermediate conveyor 52 with bottles that may be already accumulated on the first intermediate conveyor. It also minimizes the impact of bottles conveyed on the upstream conveyor with the closed gates 44. In this manner, bottles are quickly conveyed from the upstream conveyor 16 on to the intermediate conveyor 52 at a high speed, but the speed of conveyance is then reduced to avoid the problem of impacting of bottles at high speeds causing the bottles at the end of a conveyed number of bottles from falling over.

The operation of the second intermediate conveyor 54 by the signals from the three sensors 56, 58, 62 along the conveyor sent to the central processing unit 64 is the same as that described above with reference to the first intermediate conveyor 52. In addition, the operation of each of the downstream conveyors 82, 84, 86, 88 and their associated outlet sections of the intermediate conveyors 52, 54 is controlled by the central processing unit 64 in response to signals received from the photo sensors 92, 94, 96 of these conveyors in the same manner as that described above with reference to the upstream conveyor 16 and the first intermediate conveyor 52. Thus, the central processing unit 64 controls the switching of the diverter panels 46' of the second diverter assembly 66 and third diverter assembly 68 and also controls the opening and closing of the gates 44' of the second and third diverter assemblies in the same manner described above with reference to the first diverter assembly 42. The central processing unit 64 also controls the speeds of the motive sources 36" of the outlet sections 18b of the first 52 and second 54 intermediate conveyors and the motive sources 104 of the downstream conveyors when supplying bottles to the four downstream conveyors 82, 84, 86, 88 through the second and third diverter assemblies 66, 68 in the same manner described above with reference to the upstream conveyor 16 and the first intermediate conveyor 52. In this manner, the split path conveying system of the invention described above significantly increases the time efficiency of the conveyor system over those of the prior art in accumulating rows of bottles at the outlet end 98 of the conveyor system.

Figure 10:
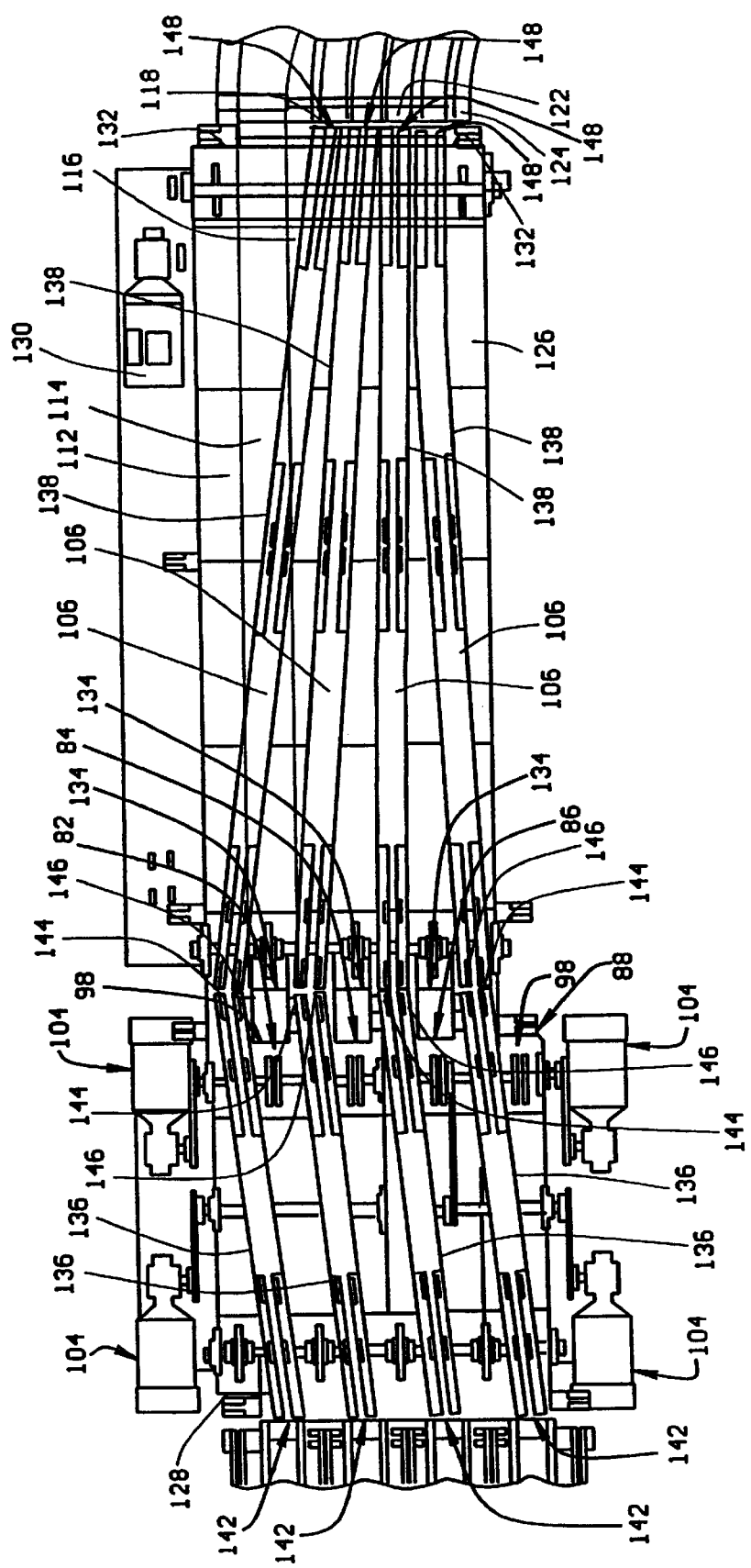
FIG. 10 is an enlarged view of a transfer assembly of the conveyor system.

FIG. 10 is an enlarged view of a transfer assembly positioned at the downstream conveyor outlet ends 98. The transfer assembly functions to position the accumulated bottles delivered at the downstream conveyor outlet ends 98 into at least four side-by-side rows of bottles that are conveyed to the bottle stop gate 10 and the row former 12. The transfer assembly includes a plurality of row conveyors, in the example shown in FIG. 10, seven row conveyors 112, 114, 116, 118, 122, 124, 126 that are arranged side-by-side at the downstream conveyor outlet ends 98. Although seven row conveyors are shown, the number could be increased for a larger number of downstream conveyors. The two outer most row conveyors 112, 126 can be table top conveyors like those employed in the conveyor system described earlier. These two conveyors 112, 126 are driven by their own motive source 130. The interior five row conveyors 114, 116, 118, 122, 124 are flex chain belt conveyors that can convey objects around curves. Each of these interior conveyors can have their speed independently adjusted by its own motive source at the palletizer end. However, if the row conveyors leading to the palletizer did not have to travel around a curve and could extend straight to the palletizer, then it would be preferred that all of the row conveyors be table top chain conveyors. As shown in FIG. 10, four of the row conveyors including the two outer most conveyors 112, 126 and a pair of the inner conveyors 116, 122 extend to the left in FIG. 10 to inlet ends 128 of these four conveyors that are interleaved with the downstream conveyer outlet ends 98. The outer most row conveyors 112, 126 extend in straight paths from their inlet ends 128 to opposite ends 132 of these two conveyors that are positioned just before the curve in the flex chain conveyors. Three of the internal flex chain conveyors 114, 118, 124 have inlet ends 134 that are aligned with the four downstream conveyor outlet ends 98 but are spaced from the outlet ends.

To bridge the gap between the inlet ends 134 of several of the row conveyors 114, 118, 124, pluralities of pairs of guides are employed. These include a first plurality of pairs of directional guides 136 and a plurality of pairs of combiner guides 138 that define the outlet lanes 106 of the conveyor. Each of the pairs of guides are basically straight pairs of rails or panels that are spaced a distance apart that is sufficiently wide to enable bottles conveyed by the conveyor to pass between the guides and be directed by the guides as they are conveyed. As seen in FIG. 10, each of the pairs of directional guides 136 have inlet ends 142 that are positioned over the downstream conveyor outlet ends 98. Each of the pairs of directional guides 136 is supported over the conveyors in angled orientations of the guides so that the inlet ends 142 of the directional guides 136 are positioned over one of the four downstream conveyors adjacent their outlet ends 98 and the outlet ends 144 of each pair of directional guides 136 is positioned over one of the row conveyors 112, 116, 122, 132. Thus, as bottles are conveyed on the downstream conveyors toward the conveyor outlet ends 98 the pairs of directional guides 136 shift the bottles transversely across the downstream conveyors onto the row conveyors 112, 116, 122, 126.

The outlet ends 144 of the directional guides 136 are positioned adjacent inlet ends 146 of the combiner guides 138. As the combiner guides 136 extend in the downstream direction they are angled across the row conveyors so that the outlet ends 148 of the combiner guides 138 are all positioned closely side-by-side. In addition, the combiner guide outlet ends 148 are all positioned over three of the flex chain row conveyors 118, 122, 124 that convey the four rows of bottles to the bottle stop gate 10 and the row former 12. The directional guides 136 and the combiner guides 138 are shown with only a small spacing between them for directing small diameter bottles. The directional guides and the combiner guides can be adjusted to a wider spacing to direct wider bottles, in which case the outlet ends 148 of the combiner guides would not be positioned over only three of the row conveyors but could be positioned over all five of the row conveyors. The combiner guides 138 receive bottles from the directional guides 136 at the inlet ends 146 of the combiner guides, and as the bottles are conveyed on the row conveyors through the combiner guides 138 the bottles are arranged in side-by-side rows before they pass out of the combiner guides 138 at their outlet ends 148.

Thus, with the transfer assembly described above, the accumulated bottles conveyed by the conveyor system are transferred from the conveyor system through the transfer assembly and are arranged in side-by-side rows on three flex chain conveyors 118, 122, 124 that further convey the rows of bottles to the bottle stop gate 10 and the row former 10.

With the split path conveyor system described above, each of the downstream conveyors 22 can have their speeds adjusted up or down independently of each other without affecting the speeds of the intermediate conveyors 18 or affecting the speeds of the row conveyors 112, 114, 116, 118, 122, 124; 126. In addition, the interior five row conveyors 114, 116, 118, 122, 124 can each have their speeds adjusted up or down independently of each other and independently of the two outer most row conveyors 112, 126.

Figure 11:
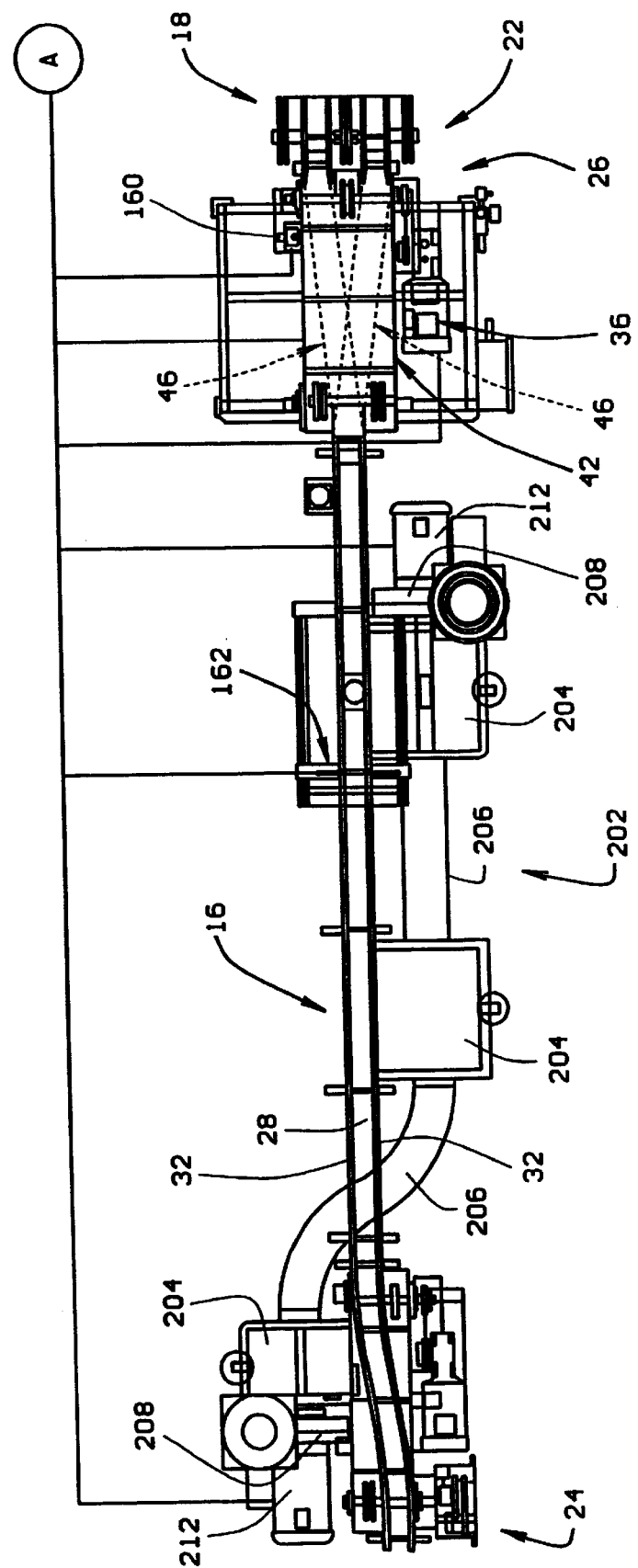
FIG. 11 is a plan view of the upstream conveyor similar to FIG. 2 but showing additional modifications to the upstream conveyor.
Figure 12:
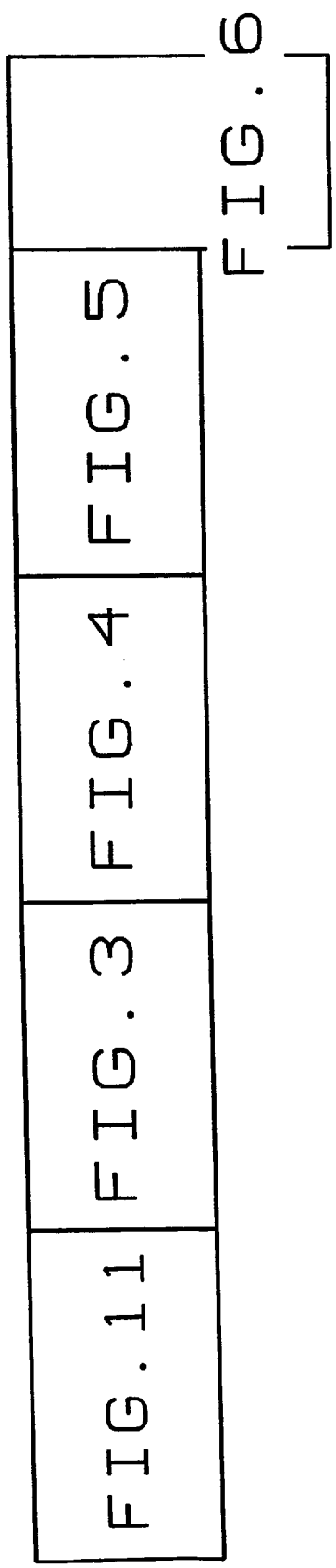
FIG. 12 is a schematic block representation similar to that of FIG. 1 but showing how FIG. 11 of the drawings is arranged relative to FIGS. 3 through 6.

FIG. 11 shows further modifications made to the upstream or infeed conveyor 16. FIG. 12 shows the position of the infeed conveyor shown in FIG. 11 relative to the remainder of the conveyor system shown in FIGS. 3–6. The upstream conveyor 16 shown in FIG. 11 is basically the same as that shown in FIG. 2 and described earlier. Like the upstream conveyor of FIG. 2, the upstream conveyor 16 of FIG. 11 selectively feeds a procession of objects to the intermediate 18 and downstream 22 conveyors. The upstream conveyor 16 has an inlet end 24 shown to the left in FIG. 11 and an opposite outlet end 26 shown to the right in FIG. 11. The conveyor is a belt or a chain conveyor having a top surface 28 that conveys a procession of objects, in this illustrative example empty, blow molded plastic bottles, between the guide rails 32 of the conveyor. It includes the motive source 36 of the first described embodiment of the upstream conveyor and provides a stream of bottles to the diverter assembly 42. Like the upstream conveyor of FIG. 2, the diverter assembly 42 is basically the same and includes the diverter gates 44 mounted on the diverter panels 46.

The upstream conveyor 16 shown in FIG. 11 differs from that of FIG. 2 in that it includes a counter or encoder 160 and the infeed sensor 34 of the FIG. 2 embodiment of the conveyor is replaced by a modified sensor 162. The modified sensor 162, the motive source 36, the diverter assembly 42 and the encoder 160 all communicate with the central processing unit CPU 64 of the conveyor system.

Figure 13:
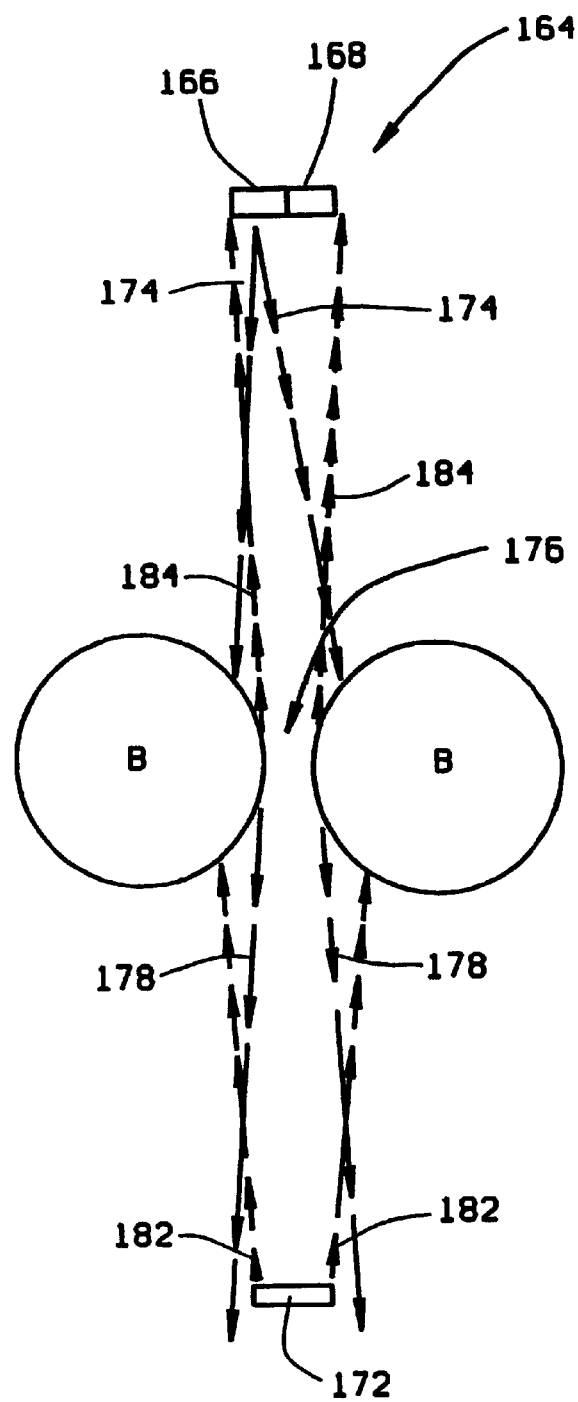
FIG. 13 is a schematic representation of how prior art photosensors function and their disadvantages.

FIG. 13 is a schematic representation of a typical photo sensor positioned on opposite sides of a conveyor and the difficulties encountered in determining an accurate gap between bottles conveyed past the photo sensors. Typically, the photo sensor 164 is comprised of a sender 166 and a receiver 168 positioned on one side of the conveyor and a reflector 172 positioned on the opposite side of the conveyor. The sender 166 would emit a signal 174 across the conveyor to sense bottles B passing by the photo sensor and also to determine any gaps 176 appearing between bottles. However, because the signal 174 sent across the conveyor would diverge as it is sent across, it would lose some of its intensity as it crossed the conveyor. In addition, the signal 174 would further lose intensity as it passes through a narrow gap 176 between adjacent bottles resulting in a weaker signal 178 being transmitted to the reflector 172. The reflected signal 182 would also diverge as it reflects back between the gap 176 of the bottles. The reflected signal would further be weakened as it passes through the gap 176, resulting in a significantly diluted signal 184 being received by the receiver 168 of the photo sensor. Thus, with this prior art arrangement it was very difficult to obtain an accurate accounting of gaps occurring between bottles conveyed along the conveyor system. Furthermore, this prior art system was incapable of sensing minute gaps between bottles.

Figure 14:
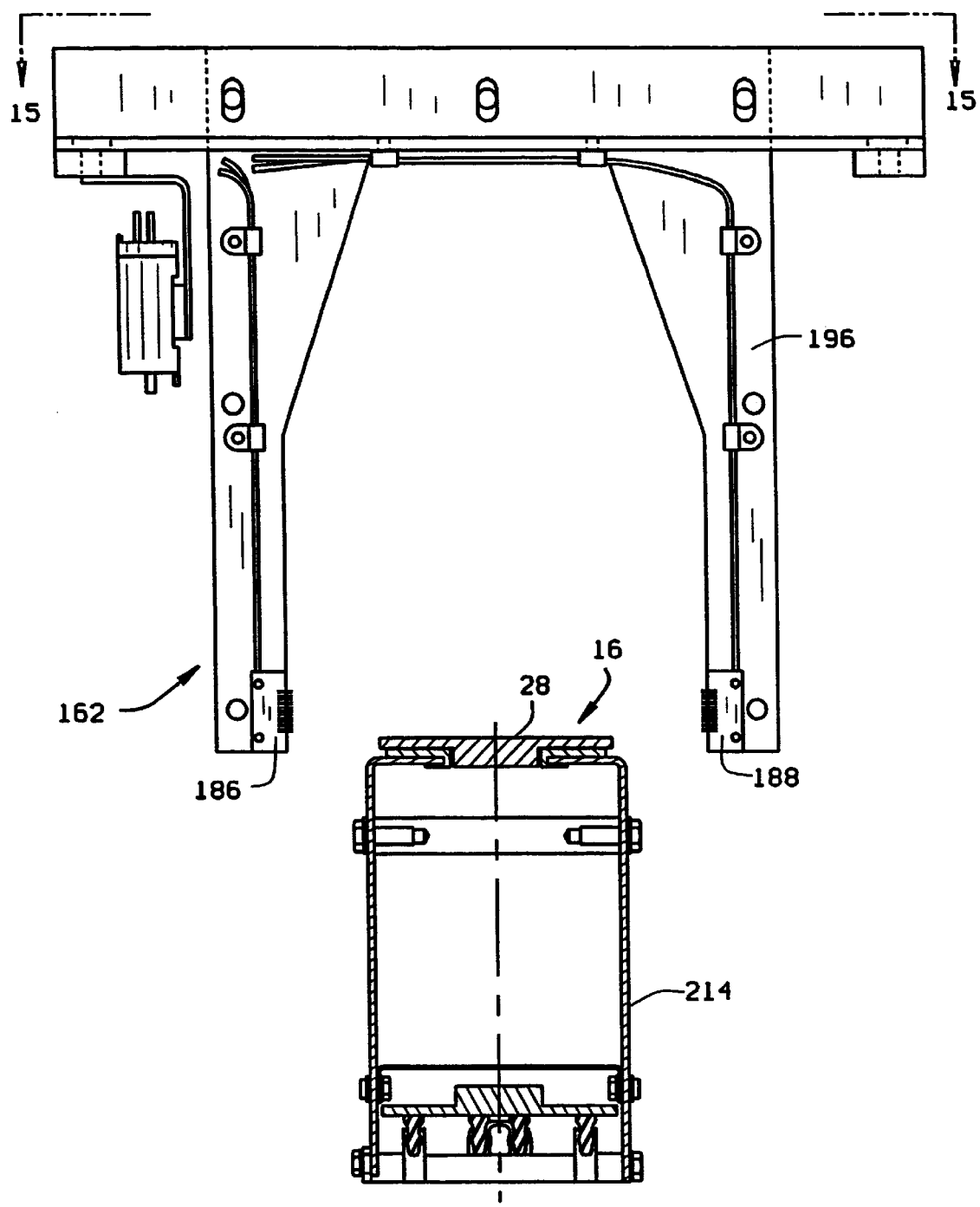
FIG. 14 is a transverse section view through the upstream conveyor of FIG. 11.
Figure 15:
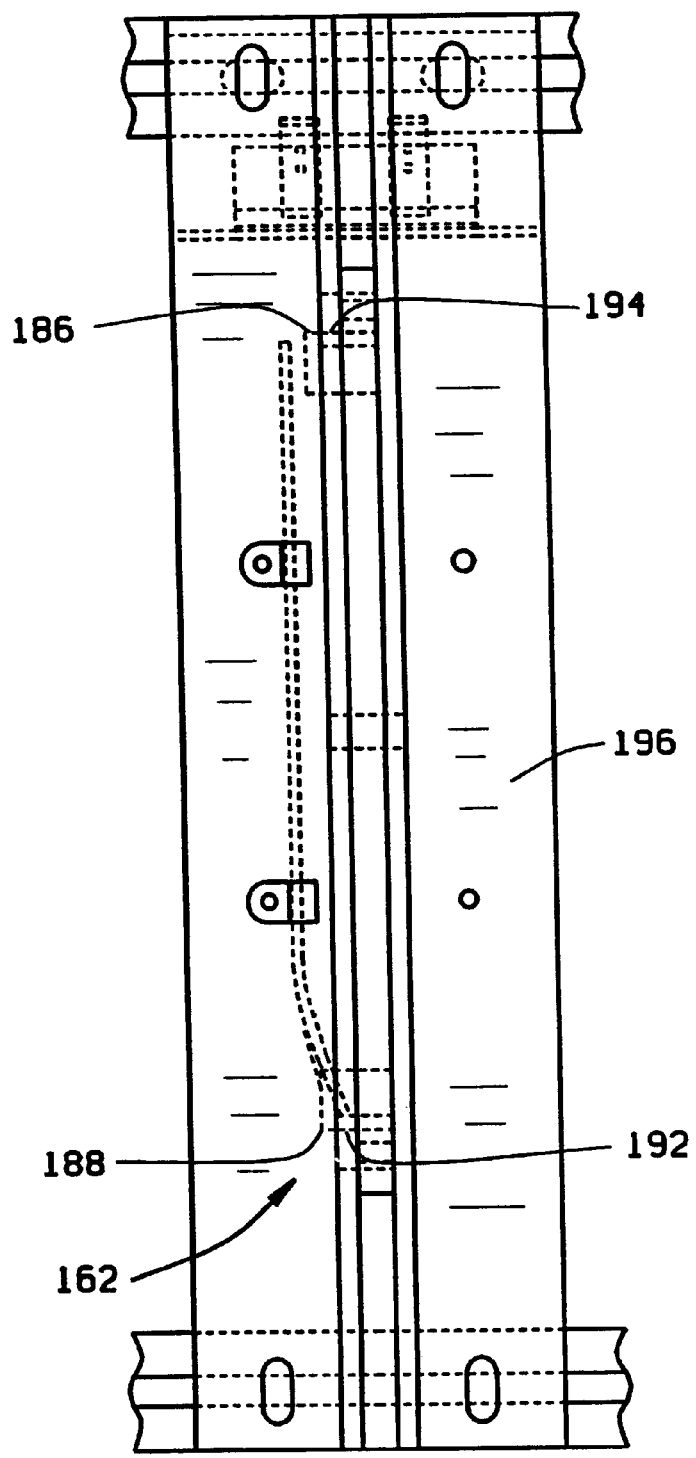
FIG. 15 is a plan view taken along the line 15—15 of FIG. 14.

A modified infeed sensor 162 of the invention employed on the upstream conveyor shown in FIG. 11 overcomes the disadvantages of prior art sensors. As shown in FIG. 11 and in more detail in FIGS. 14 and 15, the modified infeed sensor 162 employs pairs of fiber optic photo electric sensors such as the D11 and D12 mini-beam "FP"series optic fiber sensors provided by Banner Engineering Corp. of Minneapolis, Mo. As shown in FIGS. 14 and 15, a first sender 186 and receptor 188 pair of fiber optic photo sensors is positioned on opposite sides of the conveyor and a second sender 192 and receptor 194 pair of optic fiber photo sensors is also positioned on opposite sides of the conveyor. Each sender and receptor is actually a plurality of senders or receptors arranged in a single vertical column. The sender 186 of the first pair is positioned adjacent the receptor 194 of the second pair and the sender 192 of the second pair is positioned adjacent the receptor 188 of the first pair. The pairs of senders and receptors are supported on a bracket 196 that is attached to the frame (not shown) of the conveyor and positions the senders and receptors adjacent the top conveying surface 28 of the upstream conveyor 16. In this position of the senders and receptors they are assured of sensing bottles that pass between the photo sensors and are assured of accurately sensing gaps occurring between the bottles. Because bottles generally have contoured shapes as they extend upwardly from their bottoms, positioning the senders and receptors adjacent the belt surface 28 prevents inaccurate readings of gaps between adjacent bottles where bottles could actually be in engagement with each other but because of their contoured shapes above the bottoms of the bottles, there may be a gap occurring between bottles that engage each other. In the arrangement shown the first sender 186 sends signals from optic fibers arranged in a single vertical column as shown in FIG. 14 across the upstream conveyor 16 to the first receptor 188. In a like manner the second sender 192 sends signals across the upstream conveyor 16 to the second receptor 194. A majority of the receptors must receive light to register a gap. Because the signals are not reflected back to a receptor as was done in the prior art, the modified infeed sensor 162 of the invention obtains a much more accurate determination of bottles passing between the infeed sensors and more importantly obtains a much more accurate count of gaps occurring between bottles.

The encoder 160 and the modified infeed sensor 162, and specifically the sender 186 and receptor 188 of the first pair of photo sensors and the sender 192 and receptor 194 of the second pair of photo sensors communicates with the central processing units 64 which also communicates with the motive source 36, the diverter assembly 42 and the diverter assembly gates 44. The encoder 160 is also operatively connected to the upstream conveyor 16, for example by a belt and pulley connection, and sends pulsed signals to the central processing unit 64 as the upstream conveyor is operated. The pulsed signals are representative of the flight motion of the upstream conveyor 16.

In operation of the upstream conveyor in a bottle accumulating mode with the diverter gates 44 closed, the conveyor speed is increased to quickly accumulate bottles on the conveyor behind the closed gate. As long as the infeed sensor 162 is sensing light the conveyor 16 is continued to be operated with the gates 44 closed accumulating bottles behind the gates on the upstream conveyor. As bottles are accumulated on the conveyor they pass through the light beams of sensors 162 blocking the light and causing the sensor to sense a dark condition. During the dark periods of sensor 162 the CPU collects and sums pulses from the encoder 160. When a predetermined set of dark pulses is summed up by the CPU, the CPU knows that at least a number of bottles sufficient to reach back to the infeed sensor 162 have been accumulated on the upstream conveyor behind the closed gates 44. As the conveyor continues to operate the encoder 160 continues to send signals to the CPU representative of additional bottles that are accumulated behind the bottle sensed by the infeed sensor 162, whether these additional bottles are being accumulated or not. The counting by the CPU of the encoder pulses continues until it reaches a predetermined number of pulses that represents the number of bottles needed to send bottles to the downstream conveyor and to provide bottles behind the diverter gates 44 to prevent bottles from falling over upon impact of the next sequential cycle of closing the gates. When this predetermined number is reached the bottle accumulating speed of the upstream conveyor is reduced and the diverter assembly 42 is directed to the intermediate or downstream conveyor needing bottles and the gates 44 are opened. With the gates open the speed of the upstream conveyor is controlled to increase to quickly supply the bottles where needed. The number of bottles to be supplied are counted by the CPU as it receives signals from the bottle counting sensor 48.

As the upstream conveyor 16 operates at its increased speed with the first diverter gates 44 open, when the infeed sensors 162 senses any gaps occurring between the procession of conveyed bottles by the receptors 188, 194 of the sensor receiving the optical signals sent by the senders 186, 192, the CPU monitors and sums up the gaps. In order to sense a gap the majority of receptors 188, 194 of each pair must sense light. When the gaps are sensed the pulses from the encoder 160 are sent to the CPU 64 that sums up the size of the gaps. In addition, the sensed gaps are summed by the CPU 64 for the procession of bottles being conveyed by the upstream conveyor through the diverter gates 44. An acceptable size gap or summed gaps is recorded in the CPU 64 for different sizes or numbers of bottles in a procession of bottles sent through the diverter assembly 42. If the upstream conveyor runs out of bottles the sensor will sense continuous light causing the predetermined gap size to be reached very quickly. The sum of the gaps sensed is compared to the acceptable predetermined gap size to insure that the summed gap does not become too large as to present the potential problem of there being an insufficient number of bottles accumulated behind the gates 44 when the gates are closed to act as a cushion for the remaining bottles accumulated before the gates and later arriving bottles that cushions their impact with the accumulated bottles and prevents their falling over. If the predetermined total gap recorded in the CPU is reached by the gaps sensed by the sensors and summed by the CPU, the CPU will control the upstream conveyor to reduce speed and the upstream conveyor 16 will continue to operate at the reduced speed while an additional set of predetermined encoder pulse counts is reached, which also prerecorded in the CPU 64, as bottles are conveyed past the modified infeed sensor 162. This secondary encoder pulse count creates an opportunity for the conveyed bottles at reduced speed to reduce their gapping. If the gapping reduces to tolerable levels, the CPU will allow the conveyor 16 to resume its high speed. However, if the summed gap size continues to increase due to additional or continued gaps between the bottles conveyed at the lower speed such that the summed additional gap reaches the secondary predetermined encoder pulse count, then the CPU 64 will automatically control the gates 44 of the diverter assembly 42 to close, thereby ensuring that a sufficient number of bottles will remain on the upstream conveyor accumulated behind the diverter gates 44 to act as a cushion to absorb impacts of the remaining bottles on the conveyor before the gates and the later arriving bottles and preventing their falling over. With the gates 44 closed the upstream conveyor speed is increased and the procession of bottles is again allowed to quickly accumulate on the upstream conveyor and the above described process is repeated.

The alternate embodiment of the upstream conveyor 16 of the invention shown in FIG. 11 also employs a vacuum system 202. Vacuum systems are known in the prior art and therefore the system shown in FIG. 11 will only be described generally. The vacuum system 202 is basically comprised of three hollow vacuum housings 204 that are communicated with each other through vacuum pressure equalizing conduits 206. Mounted to two of the housings 204 adjacent the conveyor inlet end 24 and outlet end 26 are blowers 208 and blower motors 212. Operation of the blower motors 212 is controlled by the CPU 64. On operation of the blower motors 212 vacuums are created in the vacuum housings 204 and the vacuum pressure is equalized between the three housings by the vacuum conduit 206. Each of the vacuum housings communicates with the interior of a vacuum plenum 214 directly beneath the conveyor top surface 28 and shown in cross section in FIG. 14. A plurality of holes (not shown) pass through the belt surface 28 to the interior of the vacuum plenum 214 communicating the vacuum pressure in the plenum to the belt surface 28. This vacuum pressure holds bottles conveyed on the belt surface 28 to the belt surface and prevents bottles from falling over when impacted by other bottles or when conveyed at increased speeds or abruptly changing speeds.

Recent developments in plastic bottle constructions have enabled their constructions with thinner plastic walls. The thinner walls result in the bottles being compressed more when conveyed by the upstream conveyor 16 and held back by the gates 44 of the diverter assembly. In addition, the increased speeds of the upstream conveyor 16 also contribute to the increased pressure exerted on the bottles held back by the diverter gates 44. Still further, when the vacuum system 202 is operated holding the bottles to the belt top surface 28 it further increases the pressure exerted on a stream or procession of bottles held back by the diverter gates 44. As explained earlier, this increased pressure could result in one or more bottles springing through the gates 44 ahead of the procession of bottles as the gates are opened resulting in the one or two bottles falling over onto one of the intermediate or upstream conveyors 18 as the gates are opened.

The upstream conveyor 16 of the invention shown in FIG. 11 is modified to overcome this problem. Firstly, the central processing unit 64 is programmed so that just prior to the opening of the diverter gates 44, the motive source 36 of the upstream conveyor 16 is controlled to decrease its speed, thereby reducing the pressure exerted on the procession of bottles held back by the gates 44. This reduced pressure in the accumulated bottles of the procession reduces the likelihood of one or two bottles springing forward as the gates are opened. Still further, if the upstream conveyor 16 is operated with the vacuum system 202 disclosed, the central processing unit 64 is programmed so that the vacuum pressure created by the vacuum system 202 is decreased just prior to the gates 44 of the diverter assembly 42 being opened. The decrease in vacuum pressure further reduces the pressure exerted on the bottles accumulated behind the gates and therefore further reduces the likelihood of one or two bottles springing forward as the gates are opened. It is not necessary that the motive source 36 and vacuum system 202 be operated by the CPU 64 to both decrease their respective speeds and vacuum pressures just prior to the diverter assembly gates 44 opening, however this provides the greatest decrease in pressure exerted on the accumulated bottles. In alternative embodiments, the CPU 64 could control the motive source 36 alone to decrease its speed and thereby decrease the pressure exerted on a procession of bottles accumulated before the diverter gates 44, or the vacuum source 202 could be controlled by the CPU 64 alone to reduce the pressure exerted on a procession of bottles accumulated behind the gates 44.

Although only the upstream conveyor 16 has been described as including the improvements of the infeed sensor controls and the vacuum controls, these improvements could also be employed on the other downstream conveyors.

While the present invention has been described by a reference to a specific embodiment, it should be understood that modifications and variations of the invention may be constructed without departing from the scope of the invention defined in the following claims.

What is claimed is:

1. An apparatus for sensing and determining a size of gaps between objects conveyed by a conveyor system, the apparatus comprising:

a conveyor section having a length with opposite upstream and downstream ends;

a sensor positioned along the conveyor length, the sensor being operative to sense a gap occurring between objects conveyed by the conveyor section past the sensor; and a central controller in communication with the sensor for receiving signals from the sensor, the central controller comprising means for determining the duration of the signals received thereby calculating a total gap size of the gaps occurring between the objects conveyed by the conveyor section past the sensor.

2. The apparatus of claim 1, wherein:

a motive source drives the conveyer section and the controller communicates with the motive source and causes the motive source to decrease a speeed of the conveyer in response to the controller receiving a predetermined number of signals from the sensor.

3. The apparatus of claim 2, wherein:

a gate is positioned adjacent the downstream end of the conveyor section and is moveable between open and closed positions relative to the conveyor section where in the closed position the gate holds back objects conveyed on the conveyor section and in the open position the gate allows objects to be conveyed by the conveyor system past the gate and the controller communicates with the gate and causes the gate to move to the closed position in response to the controller receiving a set number of signals from the sensor where the set number of signals is greater than the predetermined number of signals.

4. The apparatus of claim 1, wherein:

a gate is positioned adjacent the downstream end of the conveyor section and is moveable between open and closed positions relative to the conveyor section where in the closed position the gate holds back objects conveyed on the conveyor section and in the open position the gate allows objects to be conveyed past the gate by the conveyor section and the controller communicates with the gate and causes the gate to move to the closed position in response to the controller receiving a set number of signals from the sensor.

5. The apparatus of claim 1, wherein:

the conveyor section has a top conveyor surface and the sensor is positioned adjacent the top conveyor surface where it will sense bottoms of objects conveyed by the conveyor section past the sensor.

6. The apparatus of claim 1, wherein:

the sensor is comprised of a first sender and receiver pair positioned on opposite sides of the conveyor section and a second sender and receiver pair positioned on opposite sides of the conveyor section.

7. The apparatus of claim 6, wherein:

the first sender is positioned adjacent the second receiver on one side of the conveyor section and the second sender is positioned adjacent the first receiver on an opposite side of the conveyor section.

8. A method of avoiding impacting of conveyed objects on a conveyor system that would cause an impacting conveyed object to fall over, the method comprising:

sensing gaps between objects conveyed on a conveyor section, the conveyor section having a length with opposite upstream and downstream ends, a conveyor top surface that conveys objects and a gate adjacent the conveyor section downstream end that is moveable between open and closed positions relative to the conveyor section where in the closed position the gate holds back objects conveyed on the conveyor section and in the open position the gate allows objects to be conveyed past the gate by the conveyor section;

counting the gaps sensed between objects conveyed by the conveyor section;

summing the gaps counted; and closing the gate when the sum of gaps reaches a set number of gaps.

9. The method of claim 8, further comprising:

driving the conveyor section by a motive source and causing the motive source to decrease a speed of the conveyor when the sum of gaps reaches a predetermined number.

10. The method of claim 9, further comprising:

decreasing the speed of the conveyor section prior to moving the gate to the closed position.

11. The method of claim 8, further comprising:

positioning the sensor adjacent the conveyor top surface where it will sense bottoms of objects conveyed by the conveyor section past the sensor.

12. The method of claim 8, further comprising:

positioning a first sender and a first receiver of the sensor on opposite sides of the conveyor section and positioning a second sender and a second receiver of the sensor on opposite sides of the conveyor section.

13. The method of claim 12, further comprising:

positioning the first sender adjacent the second receiver on one side of the conveyor section and positioning the second sender adjacent the first receiver on the opposite side of the conveyor section.

14. An apparatus for avoiding falling over of objects conveyed on a conveyor system, the apparatus comprising:

a conveyor section having a length with opposite upstream and downstream ends;

a motive source driving the conveyor section;

a gate positioned adjacent the downstream end of the conveyor section, the gate being moveable between open and closed positions relative to the conveyor section where in the closed position the gate momentarily stops objects conveyed on the conveyor section and in the open position the gate allows objects to be conveyed past the gate by the conveyor section; and a sensor positioned at a location along the conveyor section length upstream from the gate and being operable to sense a presence or absence of an object on the conveyor section at the location and to emit a signal indicative of the sensed presence or absence of the object, the sensor communicating with the motive source and the gate to cause the motive source to decrease a speed of the conveyor section in response to the sensor sensing the presence of an object at the location of the conveyor section.

15. The apparatus of claim 14, wherein:

the sensor communicates with the gate to cause the gate to open in response to the sensor sensing the presence of an object at the location of the conveyor section and the motive source decreasing the speed of the conveyor section.

16. An apparatus for avoiding falling over of objects conveyed on a conveyor system, the apparatus comprising:

a conveyor section having a length with opposite upstream and downstream ends;

a motive source driving the conveyor section;

a gate positioned adjacent the downstream end of the conveyor section, the gate being moveable between open and closed positions relative to the conveyor section where in the closed position the gates holds back objects conveyed on the conveyor section and in the open position the gate allows objects to be conveyed past the gate by the conveyor section;

a sensor positioned at a location along the conveyor section length upstream from the gate and being operable to sense a presence or absence of an object on the conveyor section at the location and to emit a signal indicative of the sensed presence or absence of the object, the sensor communicating with the motive source and the gate to cause the motive source to decrease a speed of the conveyor section in response to the sensor sensing the presence of an object at the location of the conveyor section;

a vacuum source communicates with the conveyor section and draws air downwardly through the conveyor section to hold objects down on the conveyor section; and the sensor communicates with the vacuum source to cause the vacuum source to decrease a vacuum on objects conveyed by the conveyor section in response to the sensor sensing the presence of an object at the conveyor section location.

* * * * *